US011112212B2

(12) United States Patent
Hyde

(10) Patent No.: US 11,112,212 B2
(45) Date of Patent: Sep. 7, 2021

(54) SECURE STORAGE SYSTEMS AND METHODS

(71) Applicant: RPH Engineering, LLC, Lehi, UT (US)

(72) Inventor: Ryan P. Hyde, Lehi, UT (US)

(*) Notice: Subject to any disclaimer, the term of this patent is extended or adjusted under 35 U.S.C. 154(b) by 0 days.

(21) Appl. No.: 16/054,174

(22) Filed: Aug. 3, 2018

(65) Prior Publication Data

US 2018/0372447 A1 Dec. 27, 2018

Related U.S. Application Data

(63) Continuation-in-part of application No. 14/106,692, filed on Dec. 13, 2013, now abandoned.

(51) Int. Cl.
| | |
|---|---|
| *F41C 33/06* | (2006.01) |
| *E05B 65/00* | (2006.01) |
| *G07C 9/00* | (2020.01) |
| *E05B 47/00* | (2006.01) |
| *F41C 33/02* | (2006.01) |
| *G08B 13/14* | (2006.01) |
| *F41C 33/04* | (2006.01) |
| *G01S 19/16* | (2010.01) |
| *G07C 9/37* | (2020.01) |

(52) U.S. Cl.
CPC .............. *F41C 33/06* (2013.01); *E05B 47/00* (2013.01); *E05B 65/0075* (2013.01); *F41C 33/0209* (2013.01); *F41C 33/041* (2013.01); *G07C 9/00309* (2013.01); *G07C 9/00912* (2013.01); *G08B 13/1436* (2013.01); *G01S 19/16* (2013.01); *G07C 9/00182* (2013.01); *G07C 9/37* (2020.01); *G07C 2009/00317* (2013.01)

(58) Field of Classification Search
USPC .............................. 206/317; 109/23, 38, 39
See application file for complete search history.

(56) References Cited

U.S. PATENT DOCUMENTS

| | | | | |
|---|---|---|---|---|
| 4,768,021 A | * | 8/1988 | Ferraro .................. | E05G 1/005 109/38 |
| 4,987,836 A | * | 1/1991 | Owen ..................... | E05B 67/36 109/52 |
| 5,009,088 A | * | 4/1991 | Cislo ...................... | F41C 33/06 109/51 |
| 5,701,770 A | * | 12/1997 | Cook ..................... | E05B 47/02 206/1.5 |
| 6,843,081 B1 | * | 1/2005 | Painter ................... | F41C 33/06 109/45 |
| 7,116,224 B2 | * | 10/2006 | Mickler ................. | F41C 33/06 340/568.1 |

(Continued)

*Primary Examiner* — Jacob K Ackun
(74) *Attorney, Agent, or Firm* — Strong & Hanni, P.C.; Joseph Shapiro

(57) ABSTRACT

A secure storage system may provide secure, portable, and rapidly accessible storage for articles such as firearms. Such a system may have a shell with first and second shell members that can be closed to keep the articles secure, or opened to provide accessibility. A locking mechanism may be used to lock the shell in the closed configuration. The locking mechanism may be controlled by a wireless receiver that receives a signal to unlock the shell. The shell may include a secure-side programming interface to allow a user to set control system parameters when the system is in the unlocked state.

8 Claims, 18 Drawing Sheets

(56) References Cited

U.S. PATENT DOCUMENTS

| | | | | |
|---|---|---|---|---|
| 7,628,112 | B2* | 12/2009 | Lindskog | E05G 1/14 |
| | | | | 109/25 |
| 8,770,117 | B2* | 7/2014 | Wall | E05G 1/024 |
| | | | | 109/48 |
| 8,826,704 | B1* | 9/2014 | Marshall | E05G 1/10 |
| | | | | 109/50 |
| 2010/0032332 | A1* | 2/2010 | Davis | G08B 13/1436 |
| | | | | 206/459.1 |
| 2012/0313783 | A1* | 12/2012 | Yang | G08B 13/1436 |
| | | | | 340/568.1 |
| 2013/0025511 | A1* | 1/2013 | Maxwell | E05G 1/04 |
| | | | | 109/59 R |
| 2013/0298807 | A1* | 11/2013 | Wall | E05G 1/024 |
| | | | | 109/38 |
| 2014/0116303 | A1* | 5/2014 | Mothersele | F41C 33/06 |
| | | | | 109/64 |

* cited by examiner

SECURE STORAGE SYSTEMS AND METHODS

TECHNICAL FIELD

The present invention relates to systems and methods for securely storing items, and more particularly, to portable safes that can be used to store handguns and other small articles.

BACKGROUND

Violent crime, particularly with the use of firearms, is on the rise in many locations. This has led many citizens to purchase their own firearms for purposes of self-defense. Many such firearms are handguns. However, secure and accessible storage of such firearms has proven to be a unique challenge.

Some individuals store their firearms in a location that provides ready accessibility, such as in a nightstand, under a bed, or in a cupboard. Unfortunately, the factors that make the firearm accessible to the user also make the firearm accessible to children and guests in the home, who may not be trained in the proper us and safety procedures for a firearm. This has led to several incidents in which children playing with firearms have been injured or killed.

Various measures such as trigger locks, separation of ammunition from the firearm, dummy ammunition, and the like have been used in an attempt to help prevent accidental firing, but such measures may be circumvented, particularly if the owner of the firearm does not know that tampering is taking place. Additionally, such measures may leave the weapon and/or ammunition too inaccessible for emergency use, as they must be removed and/or corrected by the gun owner before it can be used.

Some gun owners choose to store their firearm in a safe. Although storage in a safe can help prevent tampering, many safes utilize keys or codes that can be obtained by children or other individuals that should not have access to them. Additionally, many safes are not readily located in a place where they can easily be accessed in an emergency. Safes tend to be bulky and heavy, and therefore are not portable in many instances. Furthermore, many safes simply take too long to open in the event of an emergency.

What is needed is storage systems and methods that remedy the deficiencies of the prior art.

SUMMARY

The present invention provides a secure storage system that may remedy many of the shortcomings of the prior art. The secure storage system may have a shell with first and second shell members that cooperate to define an interior space. The first and second shell members may be movably connected together by a hinge to provide an open configuration, in which contents of the interior space are readily accessible, and a closed configuration, in which the contents of the interior space are generally inaccessible. The first and second shell members may be movably coupled together via a joint such as a hinge, which may be contained within the interior space. The first and second shell members may each have a clamshell shape with first and second rims that join at a lap joint at which the first and second rims overlap each other to help prevent forced entry.

A locking mechanism may have a locked position that keeps the first and second rims together and an unlocked position that permits them to move apart, permitting the shell to move to the open configuration. The locking mechanism may include a latch member that extends along the majority of the lateral length of the interior space, interior to the lap joint on the forward end of the shell. The latch member may translate rearward to disengage from a retention member to move the locking mechanism to the unlocked position. The configuration and location of the latch member may make it difficult to shift the locking mechanism to the unlocked position without presenting the proper credentials.

A lock release system with electrical motors may cause the translation of the latch member in response to receipt of the proper credentials from a user attempting to open the shell. The system may have a sensor system that wirelessly receives the credentials in the form of, for example, a radio frequency signal or signal from a finger or thumb of the user. An opening mechanism may urge the shell to the open configuration when the locking mechanism moves to the unlocked position.

The sensor system may include a fingerprint reader, a radio frequency receiver, a GPS receiver, and/or an accelerometer. The fingerprint reader and the radio receiver may be used to receive the credentials from the authorized user. The GPS receiver and the accelerometer may be used to determine when an attempt at forced entry and/or theft of the system is taking place, and transmit a notification to the authorized user regarding the activity that is occurring. The system may have a wireless transmitter and/or a speaker that provide audible and/or electronic notifications.

The first and second shell members may generally be made of a metal such as aluminum. In order to facilitate passage of wireless signals through the shell, the shell may have one or more apertures aligned with one or more of the sensors of the sensor system. The aperture(s) may be covered with a signal-permeable layer that protects the sensor(s) while permitting passage of wireless signals therethrough. The shell may have one or more exterior mounting features that facilitate the mounting of the shell to a fixture such as a table, a vehicle surface, a wall, the underside of a cabinet, or the like. Such mounting may position the shell at a variety of orientations.

The first and second shell members may define, respectively, first and second interior surfaces to which an article may be attached. Each of the interior surfaces may have mounting features that facilitate the attachment of one or more articles to the interior surfaces. An article such as a holster for a firearm may advantageously be attachable to either of the first and second interior surfaces to provide a variety of options regarding the orientation in which the shell is stored, Furthermore, the mounting features of one or both of the first and second interior surfaces may be designed to permit attachment of the article to the first and/or second interior surface in more than one orientation, thereby providing additional flexibility in the manner in which the articles are accessed by the user.

The GPS sensor and the accelerometer may be used to determine whether a person is attempting to tamper with or steal the system. The GPS sensor may periodically determine the location of the system, which location may periodically be compared with an approved geographic zone established by the authorized user. Similarly, the accelerometer may periodically determine the magnitude of acceleration to which the system is subjected and compare this magnitude to an approved acceleration level. If the location of the box and/or the acceleration level is beyond the approved range, the system may transmit a notification to the authorized user to indicate that the system is being stolen or tampered with.

The system may thus provide for secure, and yet rapidly accessible, storage of articles. Such a system may beneficially be used for handguns or other articles for which secure storage and ready access are desirable.

DETAILED DESCRIPTION

This application is a continuation in part of, and claims priority to, U.S. application Ser. No. 14/106,692, titled "Secure Storage Systems and Methods," filed on Dec. 13, 2013, and the inventor of which is Ryan P. Hyde." application Ser. No. 14/106,692 is incorporated by reference herein in its entirety.

Various embodiments of the invention will now be described in greater detail in connection with FIGS. 1-17. The drawings and associated descriptions are merely exemplary; the scope of the invention is defined not by these, but by the appended claims.

Figure 1:
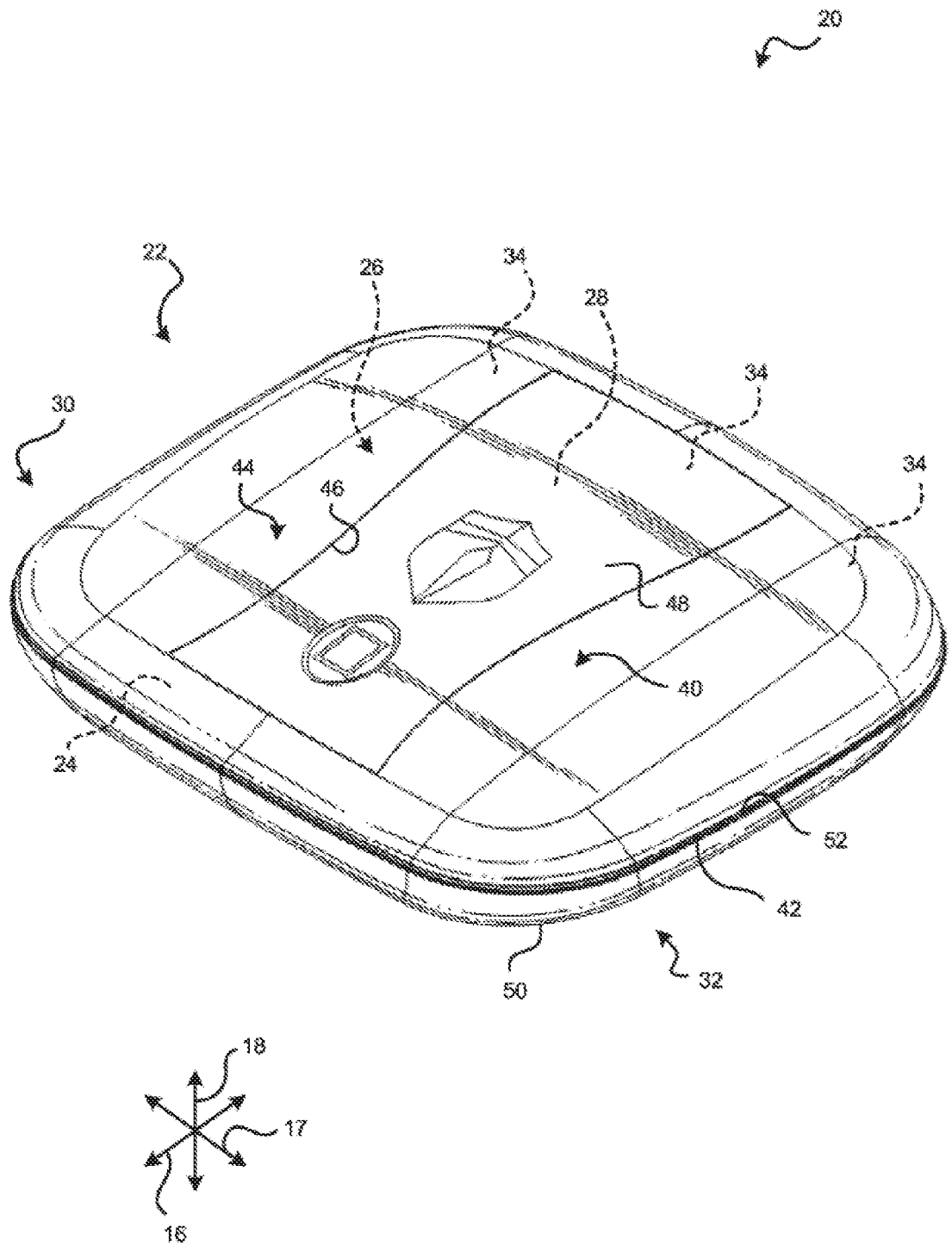
FIG. 1 is a top elevation, perspective view of a secure storage system according to one embodiment of the invention, in a closed configuration.

Referring to FIG. 1, a top elevation, perspective view illustrates a secure storage system, or system 20, according to one embodiment of the invention, in a closed configuration. The system 20 may have a longitudinal direction 16, a lateral direction 17, and a transverse direction 18, as illustrated by the directional guide. These directions will be used in connection with the description of the system 20.

The system 20 may be designed to securely store one or more articles. As embodied in FIG. 1, the system 20 may be well-suited to the storage of a firearm, such as a handgun. The system 20 may retain such a handgun securely so that only the intended user(s) may open the system 20 and obtain access to the handgun. The system 20 may provide wireless access, thereby simplifying and/or expediting the process of opening the system 20.

The system 20 may have a shell 22, which may, in the closed configuration shown in FIG. 1, define an interior space (not shown in FIG. 1) within the shell 22. The interior space may be generally inaccessible when the shell 22 is in the closed configuration. In addition to the closed configuration, the shell 22 may have an open configuration in which the interior space is readily accessible. The system 20 may have a locking mechanism 24 that keeps the shell 22 in the closed configuration until the user presents the appropriate credentials that prove that the user is an "authorized user," i.e., the owner of the system 20 or a person authorized by the owner of the system 20 to open the system 20. Presenting credentials may, in various embodiments, entail the use of a physical key, biometric verification, RF or other wireless key, verbal command, proximity of an authorized user to the system 20, combinations thereof, and/or any other known method for verifying the identity and/or authorization of a user desiring to access the contents of the system 20.

The system 20 may have a sensor system 26 that detects signals, events, and/or objects outside the system 20. The sensor system 26 may be used to simply provide data for a user of the system 20. Additionally or alternatively, the sensor system 26 may control access to the system 20, such as by detecting signals and/or biometric data from an authorized user. Additionally or alternatively, the sensor system 26 may provide notification to the authorized user in the event of use, theft, and/or tampering involving the system 20.

The sensor system 26 may include one or more sensors of a wide variety of types, including but not limited to wireless sensors that detect wireless signals, biometric sensors that detect one or more characteristics of a user, motion sensors that detect motion of the system 20, combinations thereof, and any other sensor type known in the art. Wireless sensors may detect signals such as electromagnetic radiation at any portion of the electromagnetic spectrum (including but not limited to radio frequency (RF), microwave, infrared, and visible light), air pressure variance such as that created by sound or motion, and any other known wireless signal type. Biometric sensors may detect biological data such as the patterns on a person's fingertips, hands, feet, or eyes, the thermal emissions of a person, the unique sound of a person's voice, and the like. Motion sensors may detect linear displacement, linear acceleration, rotational displacement, rotational acceleration, and any other motion characteristics. The sensor system 26 may include one or more sensors of any of these types and/or any other types known in the art.

The sensor system 26 may generally be contained within the shell 22, and will be shown and described in detail in other figures. The system 20 may also have a control system 28 that receives sensor data from the sensor system. The control system 28 may control the transmission of one or more notifications to the user regarding the status of the system 20 and/or initiate opening of the shell 22 when the proper credentials are presented. The control system 28 may also be generally contained within the shell 22, and will also be shown and described in greater detail subsequently.

The shell 22 may generally have a clamshell shape distinct from that of known secure storage systems, particularly those used for the storage of firearms. The shell 22 may have a first shell member 30 and a second shell member 32 that cooperate to define and enclose the interior space. The first shell member 30 and the second shell member 32 may be coupled together via a plurality of joints 34 that permit the first shell member 30 to move relative to the second shell member 32 to move the shell 22 between the closed configuration shown in FIG. 1, and the open configuration, which will be shown and described subsequently.

The first shell member 30 and the second shell member 32 may generally be formed of one or more strong, hard materials such as metals. According to exemplary embodiments, the first shell member 30 and the second shell member 32 may be generally made of Aluminum and/or an Aluminum alloy, which may provide a favorable balance of tensile strength, impact resistance, and weight. In other embodiments, the first shell member 30 and the second shell member 32 may be made of steel, Titanium, alloys thereof, ceramics, composite materials, and/or combinations thereof.

The first shell member 30 and the second shell member 32 may be similar to each other in shape. The first shell member 30 may have a first exterior surface 40 that generally faces upward when the system 20 is resting on a horizontal surface in a typical orientation, as shown in FIG. 1. The first exterior surface 40 may be generally flat, and may curve toward the second shell member 32 in the closed configuration to define a first rim 42. Similarly, the second exterior surface 50 may be generally flat, and may curve toward the first shell member 30 in the closed configuration to define a second rim 52. The first rim 42 and the second rim 52 may, in the closed configuration, abut each other to prevent access to the interior space.

In the embodiment shown in FIG. 1, the first shell member 30 may be formed of multiple materials including metals, which may generally block wireless signals, and non-metals, which may permit passage of wireless signals into the interior space. More precisely, the first shell member 30 may have a metal layer 44, which may be formed of a metal such as Aluminum, as described above. The metal layer 44 may define the first rim 42 and the periphery of the first shell member 30. The metal layer 44 may have a recess 46 at the center of the first exterior surface 40. At the recess 46, the material of the metal layer 44 may be recessed so that a signal-permeable layer positioned within the recess 46 may have an exterior surface flush with that of the surrounding portions of the metal layer 44. Thus, the first exterior surface 40 may have a smooth feel in spite of the fact that the first exterior surface 40 includes multiple dissimilar materials.

The recess 46 may include a recessed metal portion that supports the signal-permeable layer, and one or more apertures positioned over the sensors of the sensor system 26 to permit wireless signals to reach the sensors from outside the shell 22. Thus, the signal-permeable layer may be a sensor cover 48. The configuration of the recess 46 and associated apertures will be shown and described in greater detail subsequently.

Figure 2:
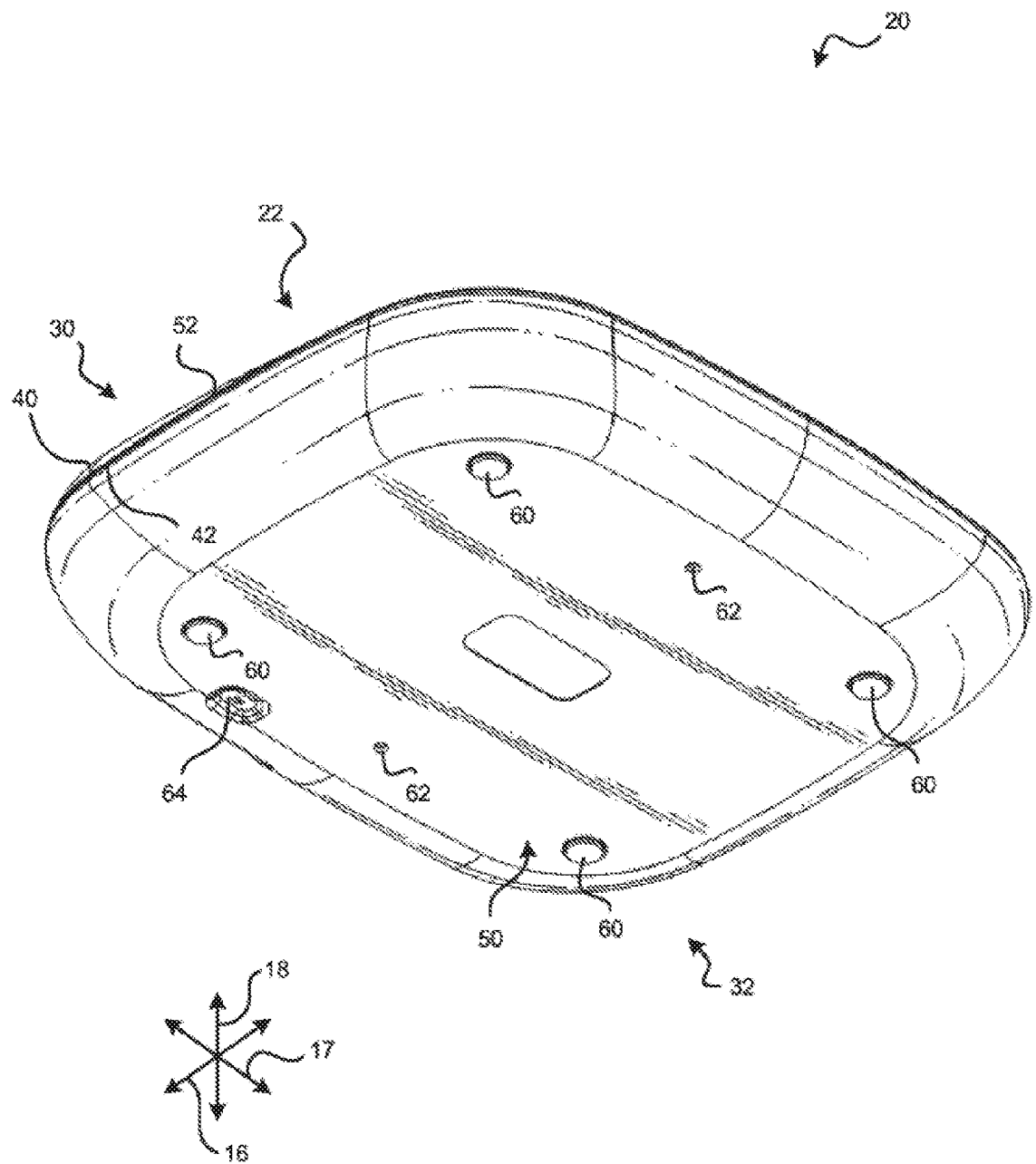
FIG. 2 is bottom elevation, perspective view of the secure storage system of FIG. 1 in the closed configuration.

Referring to FIG. 2, a bottom elevation, perspective view illustrates the system 20 of FIG. 1 in the closed configuration. The second exterior surface 50 is more clearly shown, along with various features that may be present on the second exterior surface 50.

More specifically, the system 20 may have a plurality of pads 60 secured to the second exterior surface 50. The pad 60 may, if desired, be secured to recesses of the second exterior surface 50, and may protrude downward from the second exterior surface 50. The pads 60 may be formed of a resilient material such as rubber to enable the system 20 to rest on an adjacent surface, such as the top surface of a table or shelf, without causing the relatively hard material of the shell 22 to mar the adjacent surface.

The second exterior surface 50 may also have one or more exterior mounting features that facilitate mounting of the shell 22 to such an adjacent surface. Such exterior mounting features may have a variety of configurations including various receivers such as holes, slots, grooves, and the like, and/or various protruding elements designed to be inserted into such receivers, such as bosses, posts, flanges, and the like. Such exterior mounting features may also include elements such as clips, clasps, grippers, and the like.

In the embodiment of FIG. 2, the exterior mounting features may include two holes 62. The holes 62 may receive screws, which may be inserted into the holes 62 from within the shell 22 and threaded into engagement with corresponding threaded holes on the adjacent surface. This will be shown and described in greater detail subsequently.

The system 20 may also have a switch 64, which may be positioned within a recess on the second exterior surface 50. The switch 64 may allow the user to turn off some features of the system 20, for example, to enable the system 20 to function in a low-power mode when desired. This may entail deactivating some elements of the sensor system 26 and/or the control system 28, as will be described subsequently.

Figure 3:
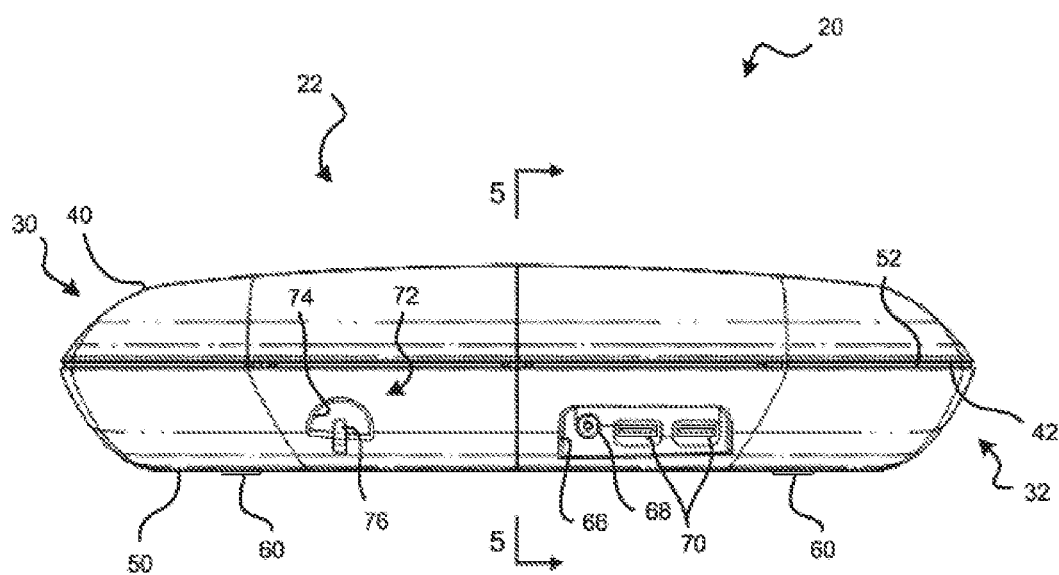
FIG. 3 is a rear elevation view of the secure storage system of FIG. 1 in the closed configuration.

Referring to FIG. 3, a rear elevation view illustrates the system 20 of FIG. 1 in the closed configuration. As shown, although the first shell member 30 may have a shape similar to that of the second shell member 32, the shapes of the first shell member 30 and the second shell member 32 may also be slightly different. The second exterior surface 50 of the second shell member 32 may have a generally planar shape that facilitates placement of the system 20 on a planar adjacent surface, such as the top of a table or shelf. However, the first exterior surface 40 of the first shell member 30 may have a slight curvature. This slight curvature may serve ornamental purposes, and may also discourage users from putting other objects on top of the system 20, where they may impede access to the contents of the system 20. The first shell member 30 may also have a slope that causes the system 20 to be thicker, in the transverse direction 18, at its rearward end than at its forward end. This slope will be shown in greater detail subsequently.

In addition to the features shown and described in FIG. 2, the second shell member 32 may have a recess 66 at its rearward end. Various electrical sockets and/or jacks may be provided in the recess 66. In the exemplary embodiment shown in FIG. 3, these may include a power port 68 and charging ports 70. The power port 68 may be a jack that receives power from and AC source such as a conventional wall outlet, or a DC source such as an external battery. The system 20 may, in one embodiment, include an AC adapter that connects to the power port 68 to provide DC power at the desired voltage and/or current to the system 20.

The charging ports 70 may be of any type known in the art. In the example of FIG. 3, the charging ports 70 may be universal serial bus (USB) ports connectable to a wide variety of devices. The charging ports 70 may be used to provide electrical power to such devices and/or enable wired communication of the system 20 with such devices. In some embodiments, notifications, status reports, sensor data, and/or other information may be conveyed such devices through the charging ports 70. Additionally or alternatively, such information may be conveyed wirelessly via any known protocol including but not limited to Wi-Fi, Bluetooth, Bluetooth Smart, near-field communications (NFC), cellular, radio frequency (RF), infrared (IR), and the like.

The second shell member 32 may also have a security attachment feature 72 that may facilitate the attachment of a security lock to the system 20. Such a security lock may include a cable with a keyed or combination lock that effectively tethers the system 20 to a fixture. One example of such a security lock is a Kensington@ Lock. Thus, a person desiring to move the system 20 may have to use the appropriate key or combination to release the cable. In the alternative, such a security lock may be a tamper indicator with a frangible element, such as a breakable plastic connector, to indicate to an authorized user when an unauthorized person has attempted to move and/or tamper with the system 20.

The security attachment feature 72 may include a recess 74 positioned behind a locking bar 76. The locking bar 76 may span at least a portion of the recess 74 such that the cable and/or other fastening member of the security lock may be inserted around the locking bar 76 and into the recess 74.

Figure 4:
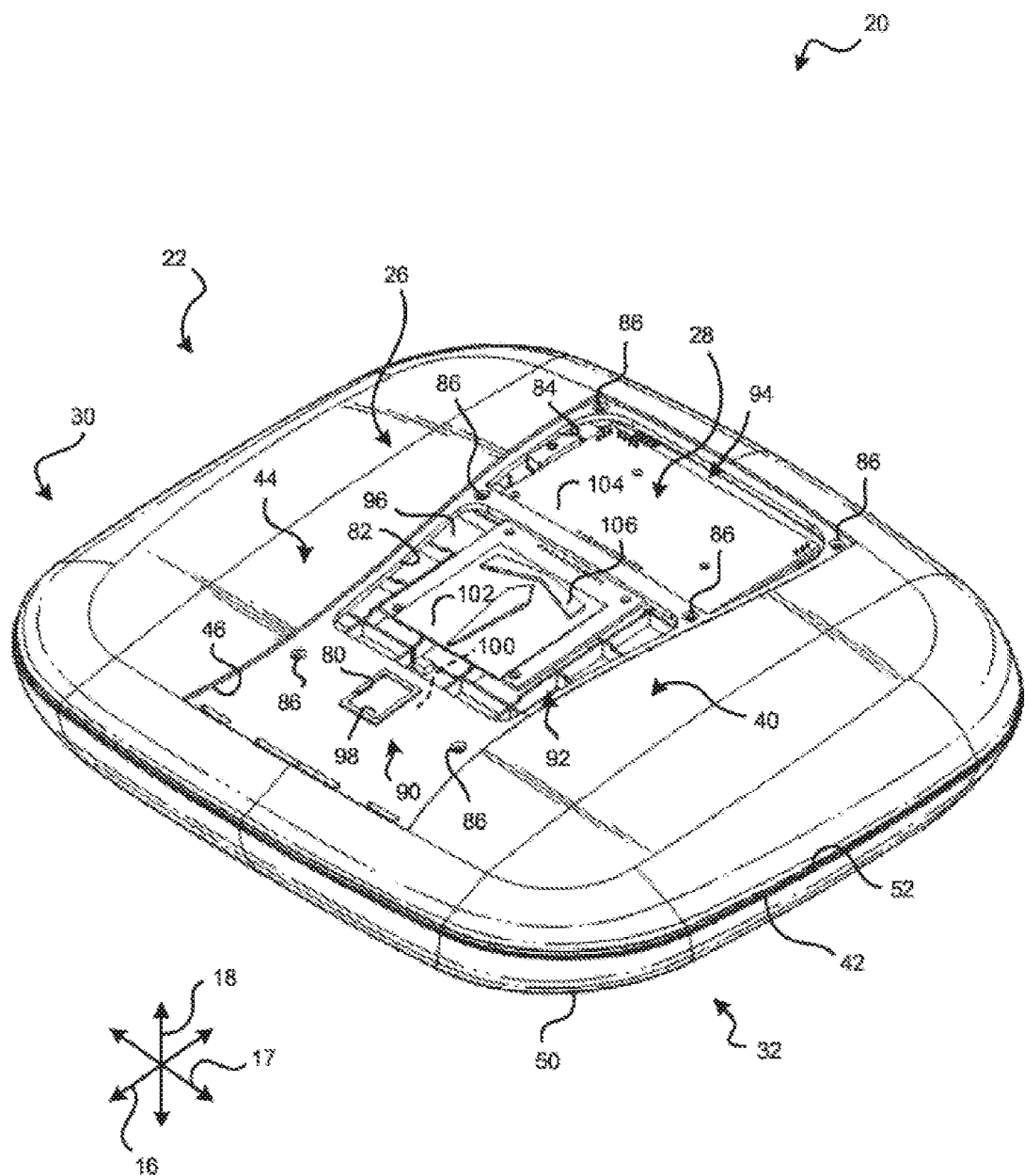
FIG. 4 is a top elevation, perspective view of the secure storage system of FIG. 1, with the signal-permeable layer removed.

Referring to FIG. 4, a top elevation, perspective view illustrates the system 20 of FIG. 1, with the sensor cover 48 removed. As shown, the metal layer 44 may generally extend across the recess 46 to support the sensor cover 48, with the exception of apertures to permit receipt of wireless signals by the sensor system 26. The metal layer 44 may, for example, define a first aperture 80, a second aperture 82, and a third aperture 84. Additionally, the metal layer 44 may have a plurality of attachment holes 86, which may receive corresponding protruding elements of the sensor cover 48 and/or fasteners, such as screws, that are used to secure the sensor cover 48 to the metal layer 44.

In alternative embodiments (not shown), the metal layer may have only a single aperture, which may accommodate passage of wireless signals to multiple sensors. Such an aperture may, for example, be the size of the recess 46. Use of a single larger aperture may advantageously facilitate passage of wireless signals to the sensors from a variety of angles, but may also make it easier for a person tampering with the shell to gain access to the contents of the shell through the aperture. Thus, in an embodiment in which the metal layer has one larger aperture, a separate piece, which may be a metal or may be non-metallic, may optionally be used to span the aperture, and may divide the aperture into multiple sub-apertures for the individual sensors of the sensor system.

The sensor system 26 may include a variety of sensors, as set forth above. In the embodiment of FIG. 4, the sensor system 26 may have a first wireless receiver that receives wireless signals through the first aperture 80, a second wireless receiver that receives wireless signals through the second aperture 82, and a third wireless receiver that receives wireless signals through the third aperture 84.

The first wireless sensor may be a biometric sensor. For example, the first wireless sensor may be a fingerprint reader 90 that reads the fingerprint of a digit (i.e., finger or thumb) a user to determine whether the user is an authorized user. The fingerprint reader 90 may be a wireless sensor in addition to a biometric sensor because it may receive and read electromagnetic radiation (for example, visible light) from the finger of the user. This light may be a reflection, from the user's digit, of light emitted by the fingerprint reader 90 itself.

The second wireless sensor may be designed to receive a wireless signal emitted by and/or reflected by a wireless key, such as a radio frequency (RF) key. Thus, the second wireless sensor may be a radio frequency receiver 92. The radio frequency key may be coded to the system 20 so that a specific key (or set of keys) is needed to open the shell 22. The radio frequency key may be attached to an object (for example, as a sticker or decal), or may be permanently embedded in such an object. Thus, the radio frequency key may easily be part of a ring, a bracelet, or another object carried by the authorized user to enable the authorized user to easily open the shell 22.

The third wireless sensor may be designed to receive signals indicating the location of the system 20. Thus, the third wireless sensor may be a GPS receiver 94 or the like. The GPS receiver 94 may receive GPS signals from GPS satellites that may enable the GPS receiver 94 and/or the control system 28 to determine the location coordinates (for example, latitude, longitude, and/or elevation) of the system 20. The GPS receiver 94 may thus provide sensor data including the location of the system 20.

The fingerprint reader 90, the radio frequency receiver 92, and/or the GPS receiver 94 may be supported within the first shell member 30 by a support structure 96, which may, if desired, be formed as a single piece with the metal layer 44. The support structure 96 may include one or more webs that extend in the longitudinal direction 16 and/or in the lateral direction 17 to provide structural strength to the first shell member 30. The support structure 96 may also serve as an additional layer protection so that, in the event that a person tampers with the system 20 by removing the sensor cover 48, he or she may still have to penetrate the support structure 96 to reach the contents of the shell 22. In some embodiments, the support structure 96 may be made separately from the metal layer 44, and may be formed of a rugged polymer such as nylon.

The first aperture 80, the second aperture 82, and the third aperture 84 may each be sized to ensure that the appropriate wireless signals are able to reach the fingerprint reader 90, the radio frequency receiver 92, and the GPS receiver 94, respectively. Thus, the first aperture 80 may be relatively small because the fingerprint reader 90 may have a fingerprint sensor 98 that protrudes through the first aperture 80 and the sensor cover 48 to receive direct contact from the user's digit, and the wireless signals from the user's digit may, predictably, come from directly on top of the fingerprint sensor 98.

If desired, the fingerprint sensor 98 may be activated by pressure from the digit so that, when the user puts a finger or thumb on the fingerprint sensor 98, the fingerprint sensor 98 automatically emits light and reads the reflected light from the finger or thumb. The fingerprint sensor 98 may also have a first circuit board 10000 at controls the operation of the fingerprint sensor 98, processes sensor data from the fingerprint sensor 98, and/or conveys sensor data such as fingerprint data or other data to one or more other components of the system 20, such as the control system 28.

Similarly, radio frequency receiver 92 may have a second circuit board 102 and GPS receiver 94 may have a third circuit board 104. The second circuit board 102 and the third circuit board 104 may each control the operation of the radio frequency receiver 92 and the GPS receiver 94, respectively, processes sensor data therefrom, and/or convey the sensor data to one or more other components of the system 20, such as the control system 28. If desired, the control system 28 may also be located on the third circuit board 104.

In alternative embodiments (not shown), the control system may be located on its own circuit board and/or the circuit boards of any other sensor of the sensor system. One or more sensors of the sensor system may share the same circuit board. Indeed, if desired, all sensors of the sensor system may share the same circuit board as the control system. Those of skill in the art will recognize that the electrical functions of the various components of a secure storage system may be gathered and/or distributed among any of the components of the system.

The radio frequency receiver 92 and/or the GPS receiver 94 may be concealed by the sensor cover 48. If desired, the radio frequency receiver 92 may also be covered by an emblem 106 that protrudes through or is otherwise visible through the sensor cover 48. Further, if desired, the radio frequency receiver 92 and/or the GPS receiver 94 may be recessed behind the second aperture 82 and the third aperture 84, respectively. The second aperture 82 and the third aperture 84 may be sized somewhat larger than the radio frequency receiver 92 and the GPS receiver 94, respectively, to broaden the angular range along which wireless signals are able to pass through the second aperture 82 and the third aperture 84 to reach the radio frequency receiver 92 and the GPS receiver 94, respectively.

Figure 5:
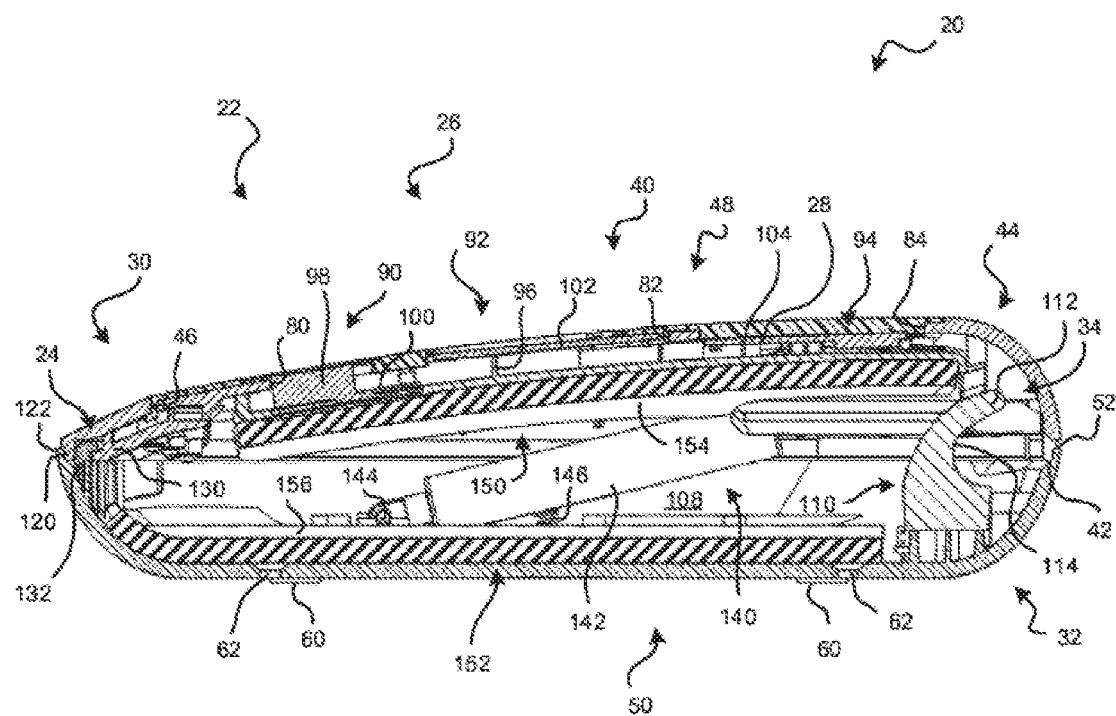
FIG. 5 is a side elevation, section view of the secure storage system of FIG. 1 in the closed configuration.
Figure 5:
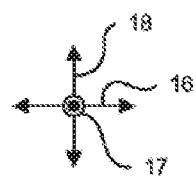

Referring to FIG. 5, a side elevation, section view through the lines marked 5-5 in FIG. 3 illustrates the system 20 of FIG. 1 in the closed configuration. The first shell member 30 may slope toward the front end of the shell 22, as shown. As mentioned previously, this slope may serve ornamental and/or functional purposes. The first shell member 30 and the second shell member 32 may cooperate to define an interior space 108. The interior space may generally have the shape of a rectangular prism, with rounded corners and/or sloped sides as defined by the interior surfaces of the first shell member 30 and the second shell member 32.

The system 20 may have various feature that enhance the structural strength of the shell 22 and/or make it more difficult to obtain unauthorized access to the contents of the shell 22. Some of these features will be described in detail below.

Each of the joints 34 may be contained within the interior space 108. This may advantageously make it more difficult for a person to force entry into the shell 22. An exposed hinge or other joint may be more subject to tampering, for example, by attempting to remove the joint from the shell, attempting to pull the pin or other retaining feature from the joint, or the like. Usage of multiple joints 34 is optional; those of skill in the art will recognize that only a single joint may be used to enable the desired relative motion between the first shell member 30 and the second shell member 32.

As shown in FIG. 5, each joint 34 may have a base member 110, which may be secured to the interior of the second shell member 32 and may extend toward the first shell member 30. The base member 110 may have a tip 112 at which the base member 110 is rotatably coupled to the second shell member 32, and a concavity 114 that permits the second rim 52 of the second shell member 32 to extend forward of the tip 112 when the shell 22 is in the open configuration, as will be shown and described subsequently.

As mentioned previously, the first rim 42 may abut the second rim 52 when the shell 22 is in the closed configuration. The first rim 42 and the second rim 52 may cooperate to define a lap joint with sufficient overlap to make it difficult for a person to pry the joint open or otherwise open the joint without first disengaging the locking mechanism 24.

More precisely, the first rim 42 may define an interior wall 120 and the second rim 52 may define an exterior wall 122. When the shell 22 is in the closed configuration, the interior wall 120 may reside interior to and directly adjacent to the interior wall 120. This overlap may define a lap joint that makes it very difficult for a person to insert an object (such as a screwdriver tip or the like) into the joint and obtain any leverage to pry the joint open. A person attempting to insert such an object into the space above the exterior wall 122 may find the insertion blocked by the interior wall 120. Furthermore, at the forward edge of the shell 22, the first rim 42 of the first shell member 30 may be recessed slightly, as shown, so that such an object cannot find purchase or leverage in any space between the first rim 42 and the second rim 52, exterior to the exterior wall 122.

The locking mechanism 24 may also be made to resist tampering and/or forced entry. The locking mechanism 24 may include a latch member 130 coupled to the first shell member 30 and a retention member 132 secured to the second shell member 32. The latch member 130 may be movable relative to the retention member 132 so that the locking mechanism 24 has a locked position in which the latch member 130 abuts the retention member 132 in a manner that permits motion of the shell 22 to the open configuration, and an unlocked position in which the latch member 130 has moved free of the retention member 132 to permit the shell 22 to move to the open configuration. The configuration and operation of the locking mechanism 24 will be shown in greater detail subsequently.

The system 20 may also have two opening mechanisms 140 that urge the shell 22 to move from the closed configuration to the open configuration. Each opening mechanism 140 may, for example, push the first shell member 30 upward relative to the second shell member 32 to urge the first shell member 30 to pivot toward the open configuration. The opening mechanisms 140 may be positioned on opposite lateral sides of the system 20; thus, in the view of FIG. 5, only one opening mechanism 140 may be visible. The other opening mechanism 140 may be substantially the same as that visible in FIG. 5.

In the embodiment of FIG. 5, the opening mechanism 140 may have an extension member 142 that is rotatably coupled to the first shell member 30 and the second shell member 32 by revolute joints 144. The extension member 142 may have an initial length when the shell 22 is in the closed configuration; the extension member 142 may be made to lengthen as the shell 22 moves to the open configuration. Additionally, as the shell 22 moves to the open configuration, the revolute joints 144 may permit the extension member 142 to move from an orientation nearly parallel to the second exterior surface 50 of the second shell member 32, as shown in FIG. 5, to an orientation in which the angle between the extension member 142 and the second exterior surface 50 is greater.

The opening mechanism 140 may also have a resilient member that urges the extension member 142 toward the orientation it will have, relative to the second shell member 32, when the shell 22 is in the open configuration. The result of this force may be to exert upward force on the first shell member 30, thereby urging the shell 22 toward the open configuration. In the embodiment of FIG. 5, the resilient member may be a linear spring 146 positioned between the extension member 142 and the second exterior surface 50. The linear spring 146 may be in a state of compression when the shell 22 is in the closed configuration, and may thus exert an upward force on the extension member 142 to push the extension member 142 in the manner indicated previously.

If desired, a damper and/or other motion slowing device may be incorporated into the extension member 142 to control the speed at which the first shell member 30 rotates to move the shell 22 to the open configuration. Such a device may provide the system 20 with a more solid feel as the shell 22 opens, and may help resist the tendency of the system 20 to bounce or otherwise move as may tend to occur if the shell 22 opens rapidly.

In alternative embodiments (not shown), a wide array of different opening mechanisms may be used. According to one example, the linear spring 146 may be omitted, and the extension member 142 may be replaced with a member that provides resilient force. For example, the extension member 142 may be replaced with a gas spring and/or a linear spring that urges the first shell member 30 to pivot into the open configuration without the need for a separate resilient member.

Those of skill in the art will recognize that other resilient members may be used, and may be coupled to the first shell member 30 and the second shell member 32 in a wide variety of configurations. In other alternative embodiments, linear and/or rotary motors may be used to further control the manner in which the shell 22 is urged into the open configuration. In yet other alternative embodiments, only one opening mechanism may be used, for example, on one side of the system 20 or the other, in place of the two opening mechanisms 140 of the system 20. In yet other alternative embodiments, the opening mechanism 140, and its counterpart that is not visible in FIG. 5, may be omitted altogether, and the user may simply open the shell 22 manually once the locking mechanism 24 has been moved to the unlocked position.

The first shell member 30 may have a first pad 150 positioned within the interior space 108 in the closed configuration. Similarly, the second shell member 32 may have a second pad 152 positioned within the interior space 108 in the closed configuration. The first pad 150 may have a first interior surface 154 and the second pad 152 may have a second interior surface 156.

The first pad 150 and the second pad 152 may be made of a relatively soft material that helps protect the contents of the system 20 from impact or other motion of the system 20. If desired, the first pad 150 and the second pad 152 may further be made of a resilient material such as rubber or neoprene. The first pad 150 and/or the second pad 152 may be designed to permit mounting of one or more articles on the first pad 150 and/or the second pad 152, as will be shown and described subsequently.

Figure 6:
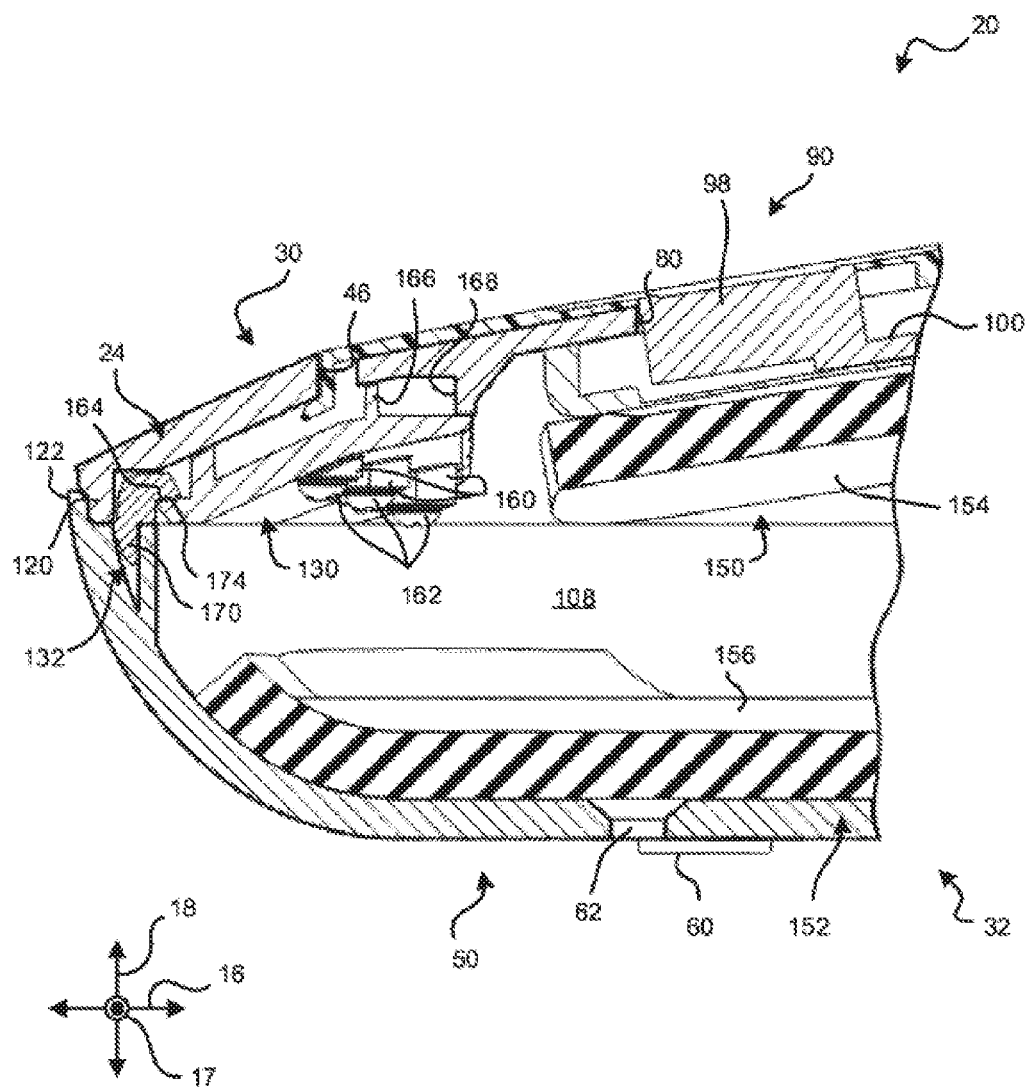
FIG. 6 is a side elevation, section view of the forward portion of the secure storage system of FIG. 1 in the closed configuration.
Figure 7:
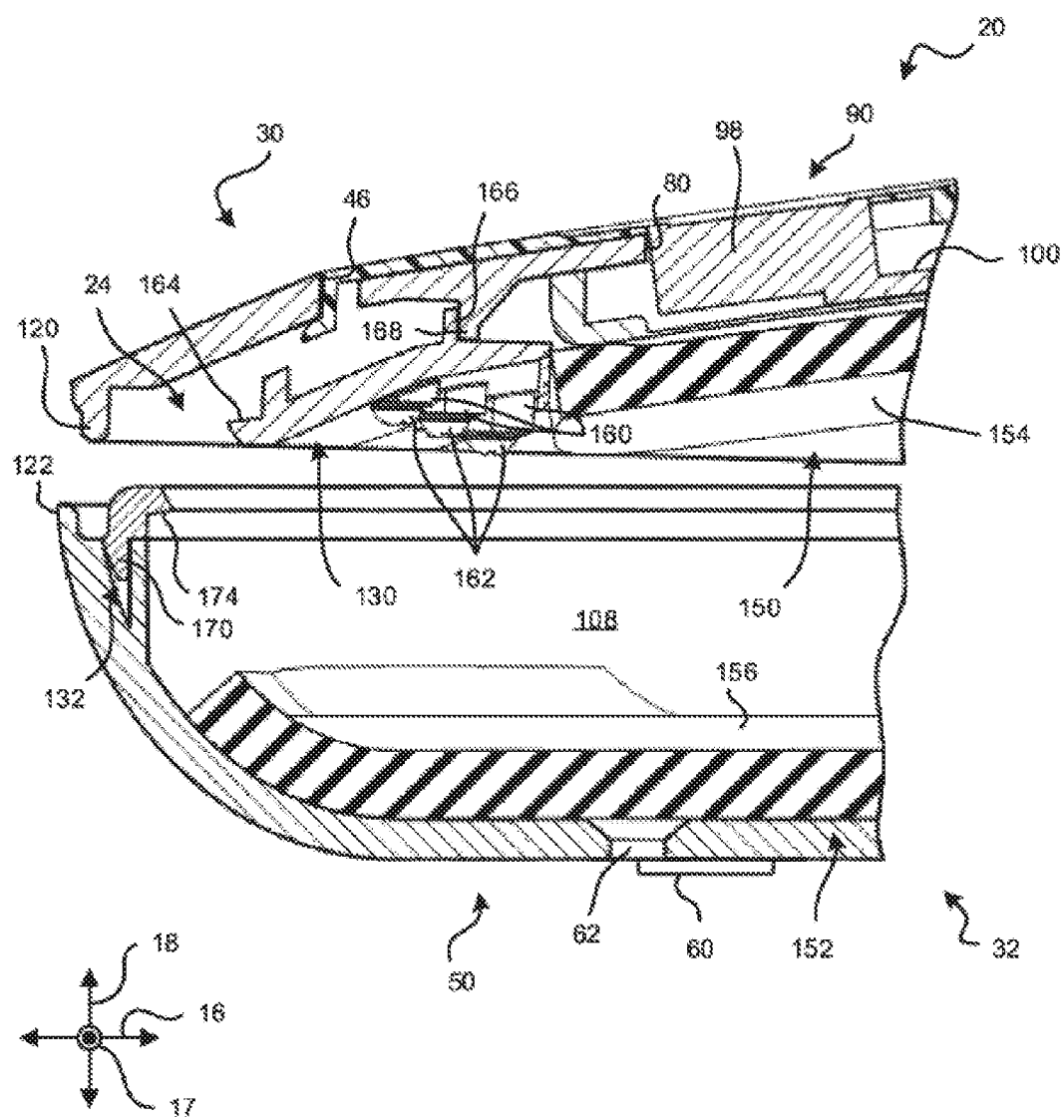
FIG. 7 is a side elevation, section view of the forward portion of the secure storage system of FIG. 1 in a partially open configuration.

Referring to FIG. 6, a side elevation, section view illustrates the forward portion of the system 20 of FIG. 1 in the closed configuration. The section view of FIG. 6 has been taken through the same section plane as that of FIG. 5. The locking mechanism 24 is in the locked position. FIG. 6 and FIG. 7 more clearly illustrate the manner in which the locking mechanism 24 functions.

As shown, the latch member 130 may have a plurality of bosses 160 that extend toward the second shell member 32. Each of the bosses 160 may have a slot (not visible in FIG. 6) that extends in the longitudinal direction 16. The latch member 130 may be secured to the first shell member 30 via a plurality of screws 162 that pass through the bosses 160 and are seated in the first shell member 30, for example, in the metal layer 44. If desired, each of the screws 162 may have a shank (not shown) with a threaded portion seated in the first shell member 30, and a non-threaded portion that passes through the boss 160 that corresponds to it. The elongation of the bosses 160 may allow the latch member 130 to translate along the longitudinal direction 16 to move the locking mechanism 24 from the locked position to the unlocked position.

The latch member 130 may have a first lip 164, which may extend toward the forward end of the shell 22. The latch member 130 may also have a motion stop 166, which may be adjacent to the interior of the first shell member 30 and proximate a motion stop 168 of the first shell member 30, which may, for example, be formed in the metal layer 44. In the locked position, the motion stop 166 and the motion stop 168 may be spaced apart. The displacement between the motion stop 166 and the motion stop 168 may limit the range of motion of the latch member 130.

The retention member 132 may have an attachment flange 170 and a second lip 174. The attachment flange 170 may protrude downward and may be retained in a groove formed in the interior of the second rim 52 of the second shell member 32. The second lip 174 may protrude rearward so that, in the locked position, the second lip 174 abuts or very nearly abuts the first lip 164 of the latch member 130 and is positioned above the first lip 164. Thus, the second lip 174 may block upward motion of the first lip 164, thereby blocking motion of the shell 22 to the open configuration.

Advantageously, the latch member 130 and the retention member 132 may both be positioned rearward of the interior wall 120 and the exterior wall 122 that define the lap joint where the first rim 42 and the second rim 52 abut each other. Thus, a person attempting to force the shell 22 open may have to first penetrate the interior wall 120 and/or the exterior wall 122 to access the locking mechanism 24.

Further, the latch member 130 and the retention member 132 may both extend in the lateral direction 17 along the majority of the length of the interior space 108 in the lateral direction 17. In fact, the latch member 130 and the retention member 132 may extend in the lateral direction 17 along nearly the entire length of the interior space 108 in the lateral direction 17, as will be shown in subsequent drawings. This length of the latch member 130 and the retention member 132 may increase resistance to the efforts of a person attempting to force the shell 22 open by providing a relatively large abutting surface area between the latch member 130 and the retention member 132.

The length of the latch member 130 and the retention member 132 may further resist attempts to force entry because the latch member 130 may have to move rearward along its entire length to slide the first lip 164 out of engagement with the second lip 174. Thus, unbalanced pressure (i.e., force acting on one side or the other of the latch member 130) urging the latch member 130 to move rearward may cause the slots of the bosses 160 to bind on the screws 162, preventing further motion. If a person succeeds in moving one side of the latch member 130 rearward, the locking mechanism 24 may remain locked because the first lip 164 on the other side of the latch member 130 may retain enough engagement with the second lip 174 to keep the shell 22 from opening.

Thus, the locking mechanism 24 may be very difficult to move, manually, into the unlocked position when the shell 22 is in the closed configuration. However, when the proper credentials are presented, the locking mechanism 24 may readily be moved to the unlocked position to enable the shell 22 to move to the open configuration. This may done through the use of a lock release system, which may be controlled by the control system 28, as will be shown and described in greater detail subsequently.

Referring to FIG. 7, a side elevation, section view illustrates the forward portion of the system 20 of FIG. 1 in a partially open configuration, with the locking mechanism 24 in the unlocked position. As shown, the latch member 130 may be retracted rearward so that the first lip 164 is out of engagement with the second lip 174. Thus, the second lip 174 may no longer block upward motion of the first lip 164 and the forward portion of the first shell member 30.

As mentioned previously, the motion stop 168 may limit the rearward motion of the motion stop 166 of the latch member 130, thereby limiting the maximum rearward displacement of the latch member 130. If desired, the locking mechanism 24 may remain in the unlocked position until locked again by an authorized user, or until the shell 22 is returned to the closed configuration.

Alternatively, the locking mechanism 24 may be made to remain in the unlocked position only long enough for the opening mechanisms 140 to begin pushing the shell 22 into the open configuration. Once the shell 22 has, for example, reached the slightly open position shown in FIG. 7, the locking mechanism 24 may return automatically to the locked configuration. This may be done, for example, by causing the lock release system to automatically return the locking mechanism 24 to the locked configuration, or by using a resilient member such as a spring (not shown) to urge the latch member 130 forward so that, in the absence of rearward force exerted by the lock release system, the latch member 130 returns to the locked position. Such a resilient member may optionally be positioned between the motion stop 166 and the motion stop 168, which positioning may prevent the motion stop 166 from abutting the motion stop 168. The resilient member may then, itself, serve as a motion stop when it reaches a fully compressed position.

Figure 8:
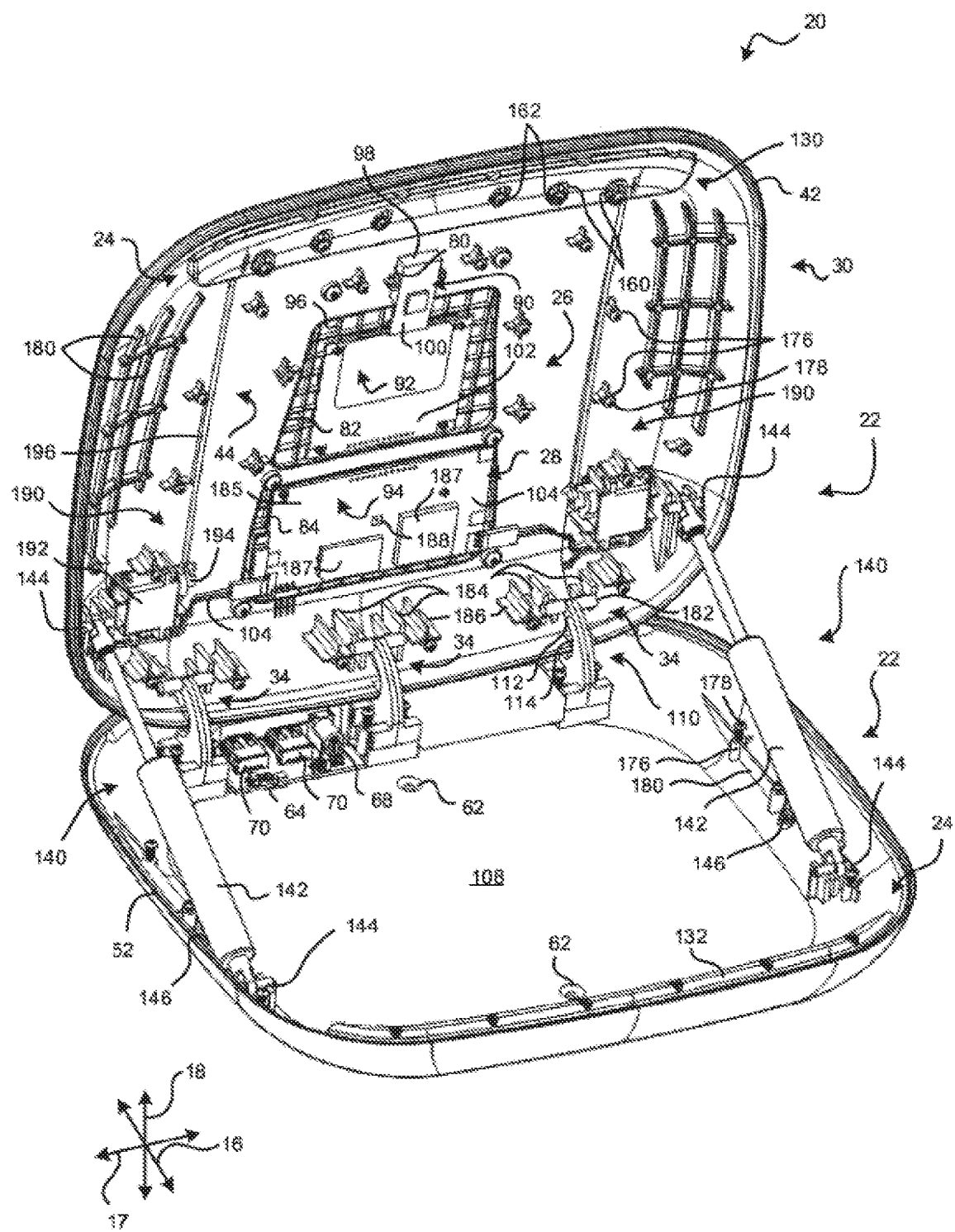
FIG. 8 is a top elevation, perspective view of the secure storage system of FIG. 1 in the open configuration, with the first and second pads removed.

Referring to FIG. 8, a top elevation, perspective view illustrates the system 20 of FIG. 1 in the open configuration, with the first pad 150 and the second pad 152 removed to reveal underlying features and components of the system 20. Other trim pieces besides the first pad 150 and the second pad 152 may optionally be used to conceal the features and components of the system 20; to the extent that such additional trim pieces are part of the system 20, they have also been removed in the view of FIG. 8.

As shown, the first shell member 30 and the second shell member 32 may each have a variety of bosses 176 that extend into the interior space 108. The bosses 176 may enhance the structural strength of the first shell member 30 and/or the second shell member 32. Screws 178, which may include various types, may facilitate the attachment of various components, including the first pad 150 and the second pad 152, to the interior of the shell 22. Additionally, a number of interior webs 180 may be formed on the interior surfaces of the first shell member 30 and the second shell member 32. The interior webs 180 may serve to structurally strengthen the first shell member 30 and the second shell member 32, particularly relative to bend the first shell member 30 or the second shell member 32 in the transverse direction 18.

FIG. 8 more clearly shows the joints 34. As shown, each of the base members 110 may have a post 182 centered at the tip 112 and extending in the lateral direction 17. The first shell member 30 may have a set of cradle flanges 184 that extends interiorly; each of the cradle flanges 184 may have a semicircular cradle that receives the corresponding portion of the post 182 adjacent to it. Additionally, the first shell member 30 may have terminal flanges 186 that extend interiorly and are positioned at the ends of some of the posts 182 as needed, to ensure that the cradle flanges 184 remain at the proper location along the lateral direction 17, relative to the posts 182. The revolute joints 144 of the opening mechanisms 140 may be held in place relative to the first shell member 30 and the second shell member 32 in a similar manner.

As also shown, the concavity 114 of each of the base members 110 may enable the second rim 52 of the second shell member 32 to extend forward of the posts 182. This may provide the proper kinematics between the first shell member 30 and the second shell member 32 to enable the shell 22 to open in the desired fashion. The joints 34 may thus cooperate with the opening mechanisms 140 to define a four-bar linkage with four revolute joints (the joints 34, the revolute joints 144 on the first shell member 30, and the revolute joints 144 on the second shell member 32) and one translating joint (provided by the extension members 142).

As described previously, the control system 28 may be incorporated into the third circuit board 104 that provides the functionality of the GPS receiver 94. The control system 28 may have a pressure switch 188 that can be accessed when the shell may have a pressure switch 188 that can be accessed when the shell 22 is in the open configuration. The pressure switch 188 may be used to enable the user to activate various settings of the control system 28, as will be set forth subsequently.

The sensor system 26 may also include an accelerometer 187, which may also, optionally, be located on the third circuit board 104. The accelerometer 187 may detect acceleration of the system 20. Thus, the accelerometer 187 may provide sensor data that indicates when motion of the system 20 occurs, such as a person opening up, picking up, shaking, flipping over, hitting, or carrying the system 20.

The accelerometer 187 may thus provide an indication of ordinary use, tampering with, and/or theft of the system 20. The accelerometer 187 and/or the control system 28 may have a sensitivity level that matches the type of events that should be reported to the authorized user. For example, if the authorized user wants to receive notification whenever the shell 22 is opened or undergoes any motion, the accelerometer 187 may be set to a very sensitive level. However, if the authorized user only wants to receive notification if the shell 22 is impacted (as may occur if the system 20 is dropped or struck in an attempt to gain entry), the accelerometer 187 may be set to a less sensitive level.

The accelerometer 187 may be of a type that measures linear acceleration, angular acceleration, or both linear and angular acceleration. In the event the accelerometer 187 detects more than one type of motion, the control system 28 may be designed to trigger alarms based on thresholds that are specific to each type of motion. Such thresholds may be based on linear and/or angular acceleration, velocity, and/or position. Velocity and position may be determined by integrating or otherwise extrapolating acceleration data.

According to one example, the threshold linear acceleration may be a multiple of the gravitational constant (9.81 m/s2). If the threshold linear acceleration is equal to or just below the gravitational constant, the accelerometer 187 may not trigger any alarms or notifications unless the system 20 is falling. Thus, it may be desirable to set the threshold linear acceleration at a lower level, such as 5 m/s2, 2 m/s2, 1 m/s2, 0.5 m/s2, or 0.25 m/s2.

As mentioned previously, velocity or position may be used in addition to or in the alternative to acceleration. In the context of angular position, the threshold angular position may be set at a certain tilt angle that will indicate tampering or deliberate motion of the system 20 are occurring. For example, the threshold angular position change may be 1°, 2, 50, 10°, 20°, 30°, 45 0, 60°, 75°, or even 90°. Any of the thresholds applicable to the accelerometer 187 may be user-configurable, if desired.

The system 20 may also have a wireless transmitter 189, which may also be positioned on the third circuit board 104. As mentioned previously, the system 20 may communicate wirelessly via a wide range of technologies, including Wi-Fi, Bluetooth, Bluetooth Smart, near-field communications (NFC), cellular, radio frequency (RF), infrared (IR), and the like. The wireless transmitter 189 may be designed to communicate along any of these protocols, or on any other type of wireless network known in the art.

According to certain embodiments of the invention, the wireless transmitter 189 may be designed to connect to a Wi-Fi system such as those found in many homes. The wireless transmitter 189 may thus transmit notifications and/or other information to the Wi-Fi system, which may convey the information to an electronic device near the authorized user via the Internet. This electronic device may be a computer, tablet, phone, smart phone, or the like. The notification may take the form of a text message, e-mail message, automated phone call, or the like.

Transmitting the notification to the electronic device near the authorized user may entail transmitting the information to a server, which may be maintained by the manufacturer of the system 20. The server may store user-specific data regarding the system 20 owned by the user, the identity of the authorized user, the authorized user's preferred mode of receiving notifications, the applicable IP address, mobile phone, MAC address, or other identifier of the electronic device at which the authorized user wishes to receive notifications, the location of the system 20, and/or other information.

In some embodiments, the server may only store enough information to properly route the notification to the electronic device near the authorized user. In such embodiments, the location of the system 20, the identity of the authorized user, and/or other personal information may be omitted from the server in order to satisfy privacy or other concerns.

In addition to or in the alternative to the wireless transmitter 189, the system 20 may include a sound device 185 such as a speaker, buzzer, and/or any other sound-producing device. The sound device 185 may be incorporated into the third circuit board 104 as shown, or may be separate element.

The sound device 185 may be used to provide notification to the user of tampering, theft, or other aspects of the status of the system 20 via an audible alarm or tone alarm or tone. This may be done in addition to or in the alternative to the transmission of a wireless notification to the electronic device. According to some embodiments, the type of notification provided to the authorized user may determine the type of notification provided. For example, detection by the accelerometer 187 of excessive acceleration may result in an audible notification, while detection by the GPS receiver 94 that the system 20 has moved beyond an acceptable range may result in transmission of an electronic notification.

The system 20 may have a pair of lock release systems 190 that cooperate to provide the mechanical force needed to move the locking mechanism 24 from the locked position (as in FIG. 6) to the unlocked position (as in FIG. 7). The lock release systems 190 may each have a motor 192 that rotates a linkage 194. The linkage 194 may be a cam, eccentric disc, or other structure that transmits the rotational output of the motor 192 to translation. The linkage 194 may be coupled to a rod 196, which may extend from the linkage 194 to the corresponding side of the latch member 130.

Thus, when a user presents the proper credentials, the sensor system 26 may detect the associated wireless signal(s) and provide the corresponding sensor output to the control system 28. The control system 28 may trigger the motors 192, which may rotate the linkages 194. The rotation of the linkages 194 may pull rearward on the rods 196, which may, in turn, pull the latch member 130 rearward. Thus, the locking mechanism 24 may be moved from the locked position to the unlocked position.

Presentation of the proper credentials may occur according to parameters established by the user. For example, when the system 20 is initially set up, the user may determine that either detection of the proper fingerprint with the fingerprint reader 90, or detection of the proper radio frequency key with the radio frequency receiver 92, may be sufficient to unlock the system 20. Alternatively, the user may determine that both detection of the proper fingerprint and detection of the proper radio frequency key are required to unlock the system 20. This setting may, for example, be established through the use of the pressure switch 188, which may only be accessed when the shell 22 is in the open configuration.

If desired, the switch 64 may be used to further control how the system 20 can be opened. For example, the switch 64 may be used to shift the system 20 to a power-saving mode in which the radio frequency receiver 92 is disengaged. The radio frequency receiver 92 may consume significantly more electrical power than the fingerprint reader 90 due to the fact that the fingerprint reader 90 may only be activated when pressed by the user's finger or thumb. The radio frequency receiver 92, by contrast, may transmit a continuous or intermittent signal to determine whether the radio frequency key is present.

Thus, disabling the radio frequency receiver 92 may conserve considerable power while still permitting the authorized user to obtain access to the system 20. The system 20 may have an internal battery (not shown) which may be rechargeable, and may be charged when the power port 68 is connected to an external power source. It may be desirable to disconnect the system 20 from the external power source, for example, to transport the system 20. Using the switch 64 to engage the power-saving mode may help to extend the life of the internal battery in such situations. If desired, the power-saving mode may also disable the GPS receiver 94 or shift the GPS receiver 94 into a power-saving mode with less frequent location scanning.

Figure 9:
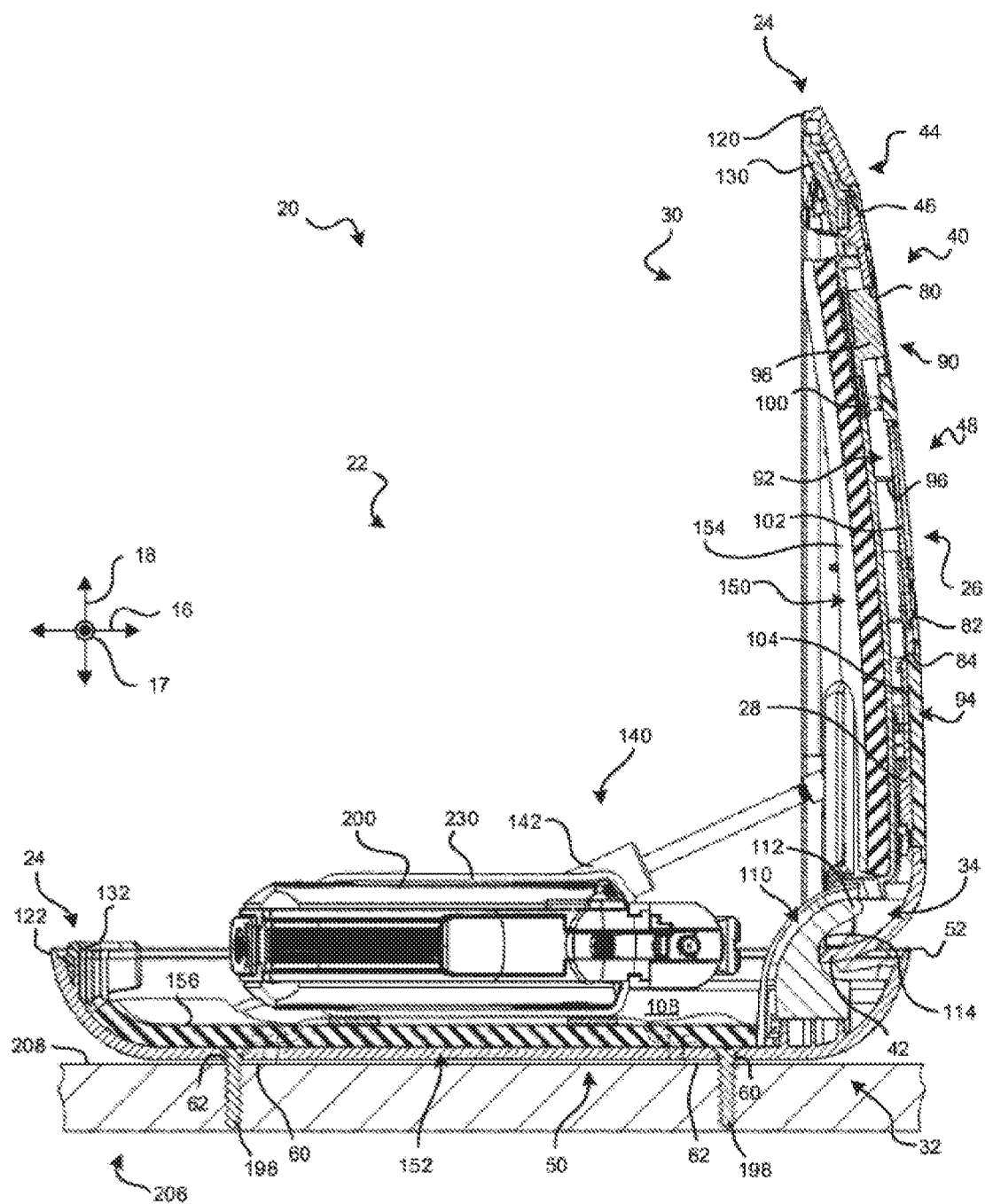
FIG. 9 is a side elevation, section view of the secure storage system of FIG. 1 in the open configuration attached to a fixture, with a handgun positioned within the interior space.

Referring to FIG. 9, a side elevation, section view illustrates the system 20 of FIG. 1 in the open configuration attached to a fixture, with a handgun positioned within the interior space 108. The system 20 may contain a wide variety of articles, including firearms, small valuables, papers, and the like. The system 20 may also have a wide variety of sizes to accommodate differing needs.

In the exemplary embodiment of FIG. 9, the system 20 may be sized to contain an article in the form of a handgun 200. The handgun 200 may rest directly on the second pad 152 of the second shell member 32. When the shell 22 is moved back to the closed configuration, the handgun 200 may then be effectively sandwiched between the first pad 150 and the second pad 152, thereby helping to keep the handgun 200 in place and protect it until the system 20 is opened.

Alternatively, the handgun 200 may be placed in a holster 230, as shown. The holster 230 may be designed to secure the handgun 200 within the system 20 in a manner that will be shown and described subsequently.

As shown, the system 20 may be mounted to a fixture 206, which may be any item exterior to the system 20. The fixture 206 may have an adjacent surface 208 that is adjacent to the system 20 once mounting has been carried out. The system 20 may be mounted to the fixture 206 through the use of any known attachment method including mechanical fastening, adhesive bonding, chemical bonding, welding, and the like. In the embodiment of FIG. 9, the system 20 may be mounted to the fixture 206 via fasteners in the form of screws 198 that are inserted through the exterior mounting features of the second exterior surface 50 (i.e., the holes 62). The screws 198 may be inserted through the holes 62 and through aligned holes within the fixture 206.

The fixture 206 may include any item to which the system 20 may beneficially be mounted. The adjacent surface 208 need not be horizontal, and need not face upward. Thus, the fixture 206 may be a table, shelf, wall, ceiling, vehicle panel, the underside of a cupboard, or the like. The holster 230 may be designed to be attached to the system 20 in a manner that permits secure retention of the handgun 200 within the interior of the system 20 in any of a variety of orientations of the handgun 200 and/or the system 20. This will be described in greater detail subsequently.

Figure 10:
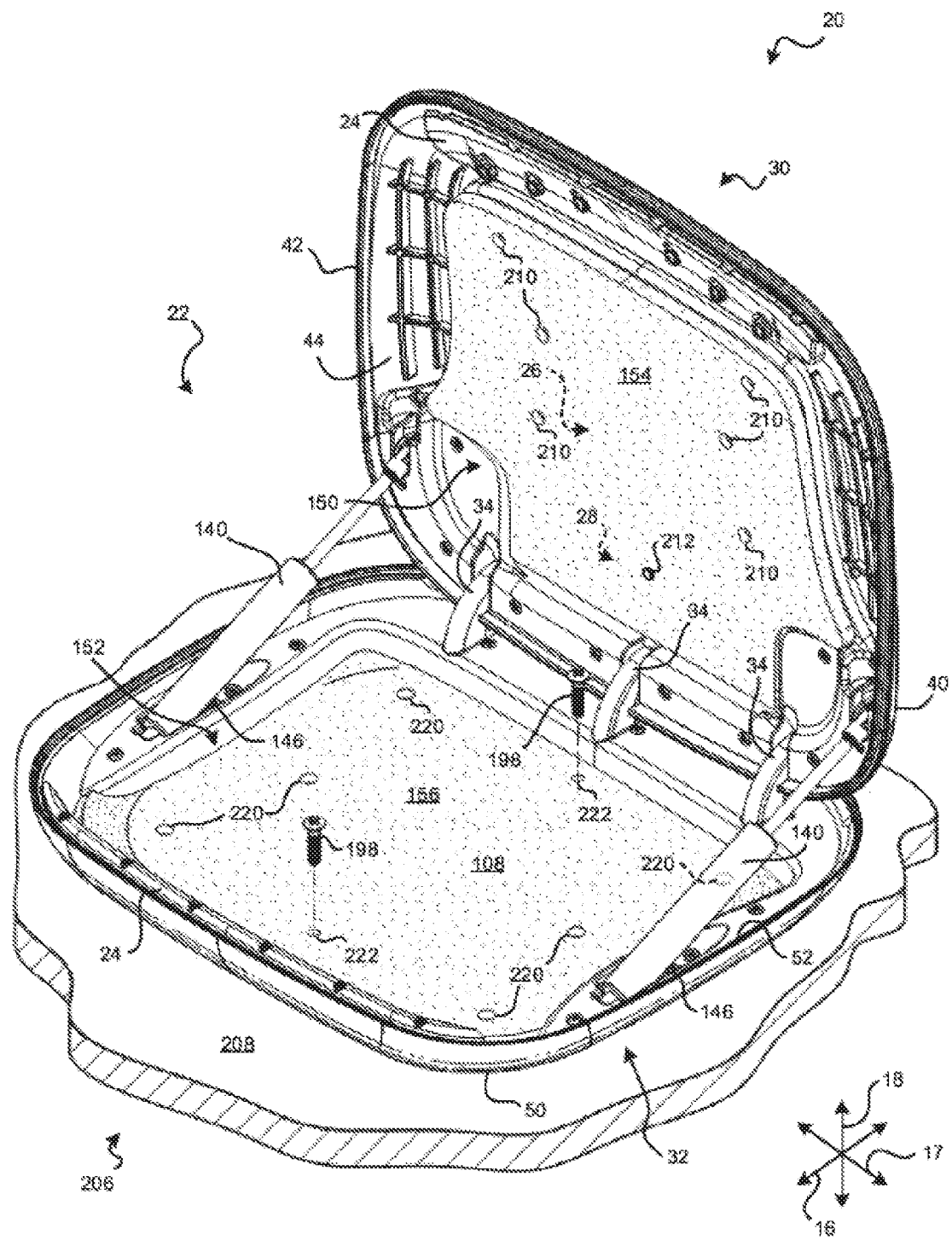
FIG. 10 is a top elevation, perspective view of the secure storage system of FIG. 1 in the open configuration, attached to the fixture, with the handgun removed.

Referring to FIG. 10, a top elevation, perspective view illustrates the system of FIG. 1 in the open configuration, attached to the fixture 206, with the handgun 20000 moved. The configuration of the first pad 150 and the second pad 152 are shown in greater detail.

More specifically, the first pad 150 may have a plurality of mounting features designed to permit an article to be attached to the first pad 150. The mounting features may have a variety of configurations including various receivers such as holes, slots, grooves, and the like, and/or various protruding elements designed to be inserted into such receivers, such as bosses, posts, flanges, and the like. Such mounting features may also include elements such as clips, clasps, grippers, and the like.

As embodied in FIG. 10, the mounting features on the first pad 150 may be holes 210. The holes 210 may be arranged in a pattern that provides for secure attachment of the article. If desired, the holes 210 may possess mirror and/or radial symmetry so as to permit attachment of the article to the first pad 150 at any of a plurality of relative orientations. As illustrated in FIG. 10, the holes 210 may have mirror symmetry along the lateral direction 17 and along the transverse direction 18 when the shell 22 is open as shown. This symmetry may permit the article to be attached to the first pad 150 in at least two distinct orientations (for example, right-side-up and up-side-down relative to the first pad 150).

In alternative embodiments (not shown), the hole 210 (or alternatively, other mounting features) may be arranged in a circular or other radially symmetrical pattern that enables for the article to be attached to the first pad 150 at a wider variety of relative orientations. For example, a series of six holes in a circular pattern, with equal spacing between the holes, may permit an article to be attached to the first pad 150 at six distinct relative orientations, with each set of adjacent orientations displaced from each other by a 60° angular variance.

The first pad 150 may also have a button 212, which may protrude slightly from the body of the first pad 150 so as to be easily pressed by a user. The button 212 may be connected to the pressure switch 188 on the third circuit board 104 so that, with the shell 22 in the open configuration, the user can press the button 212 to control various settings of the system 20. Such settings may include, but are not limited to, the credentials required to open the system 20, the approved geographic zone of the system 20, and the like. The button 212 is one type of user input device that may be used by an authorized user to determine the settings of the system 20. In other embodiments (not shown), other user input devices may be used including buttons, touch screens, external computer peripherals, wireless transmitters, and the like.

The second pad 152 may also have mounting features, which may include any of the types set forth in the discussion of the mounting features of the first pad 150. As embodied in FIG. 10, the mounting features may take the form of holes 220. Like the holes 210, the holes 220 may be arranged with mirror and/or radial symmetry so as to permit attachment of an article to the second pad 152 at any of a plurality of relative orientations. Radial symmetry of the holes 220 may be used in alternative embodiments to provide additional relative orientations, as described in connection with the holes 210.

If desired, the, holes 220 may have a configuration and arrangement similar to or identical to those of the holes 210 of the first pad 150. This may provide additional flexibility in the attachment of an article within the system 20. More specifically, the article may then be attached to either the first pad 150 or the second pad 152, with the same orientation options available. The holes 210 and/or the holes 220 may only extend into the first pad 150 and the second pad 152, or may be thru holes that are aligned with corresponding holes (not shown) of the first shell member 30 and the second shell member 32. In such a case, the material of the first pad 150 and the second pad 152 need not be sturdy enough to receive and retain screw threads; rather, the threads may be retained in the corresponding holes of the first shell member 30 and the second shell member 32.

In addition to the holes 220, the second pad 152 may have a pair of holes 222 that receive the screws 198 used to mount the system 20 to the fixture 206. Thus, the user may mount the system 20 to the fixture 206 without having to remove and reinstall the second pad 152.

Figure 11:
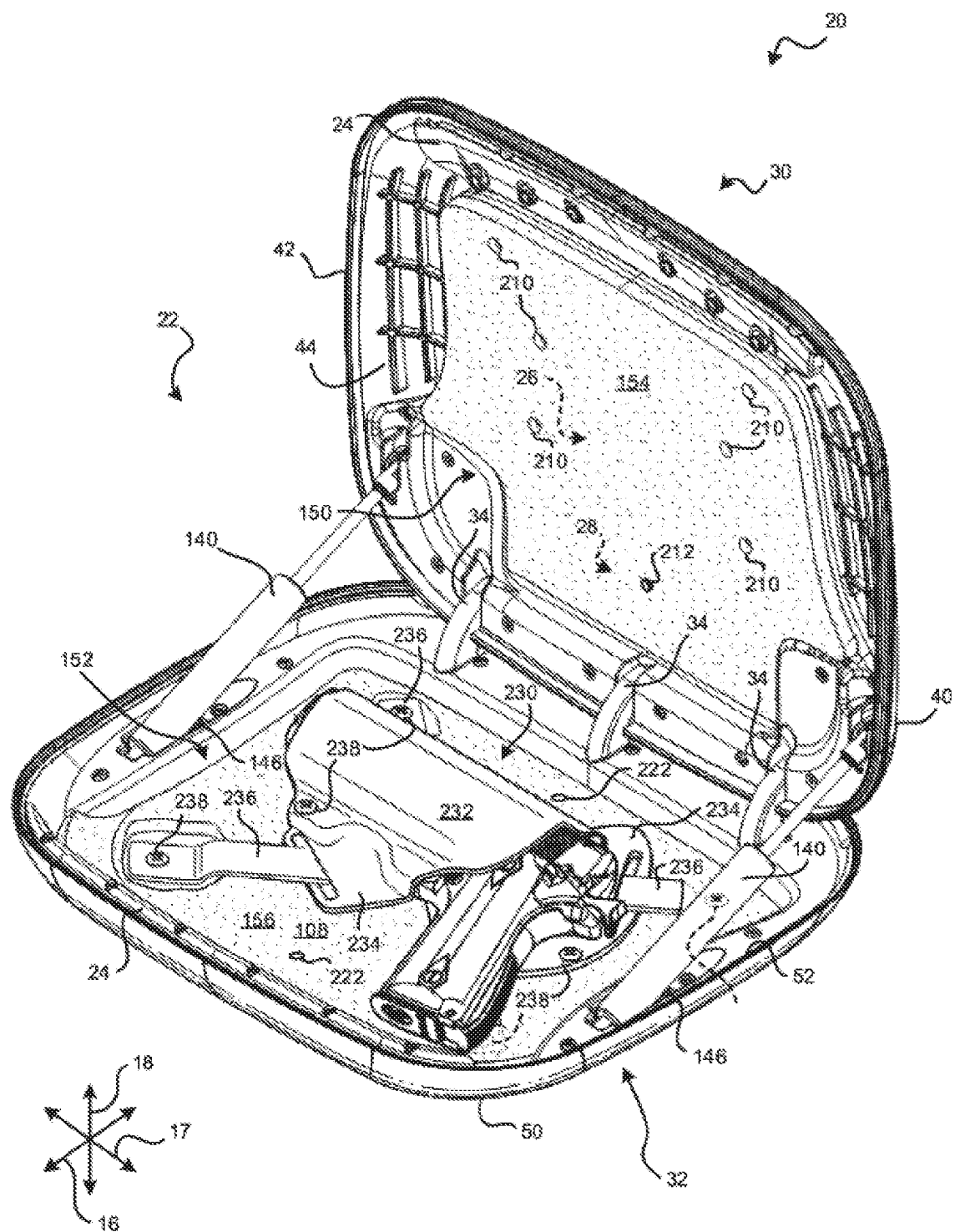
FIG. 11 is a top elevation, perspective view of the secure storage system of FIG. 1 in the open configuration, with the handgun retained in a holster attached to the second pad.

Referring to FIG. 11, a top elevation, perspective view illustrates the system 20 of FIG. 1 in the open configuration, with the handgun 20000 tained in the holster 230 attached to the second pad 152. The attachment of the holster 230 may help to hold the handgun 20000 place during transportation of the system 20, and may ensure that the handgun 20000 in a predictable location for ready access and use when the shell 22 is opened.

The holster 230 may be designed for attachment to the system 20. The holster 230 may have a wide variety of shapes and sizes, and may be attached to the second pad 152 in various ways, including but not limited to mechanical fastening, adhesive or chemical bonding, welding, and the like.

Figure 12:
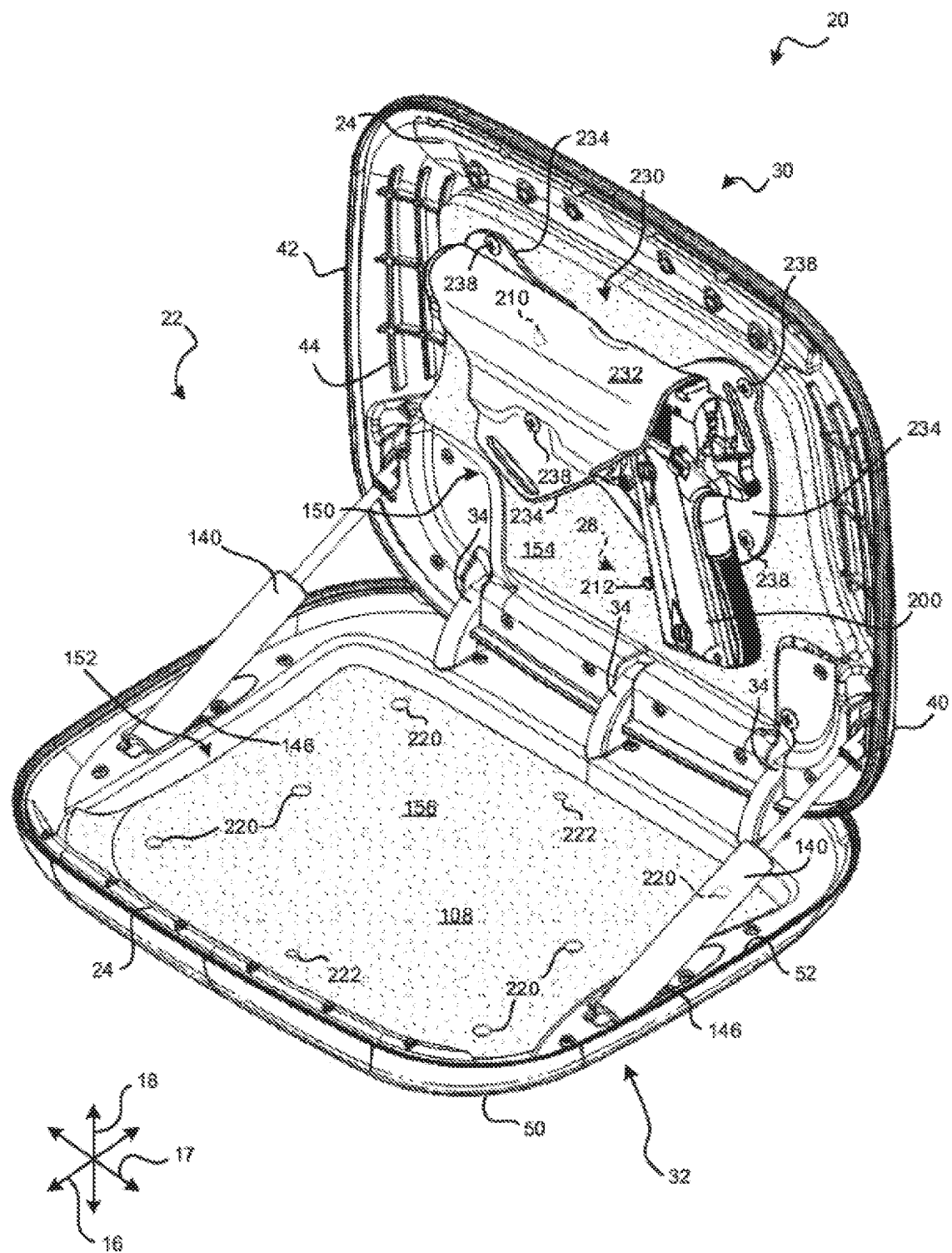
FIG. 12 is a top elevation, perspective view of the secure storage system of FIG. 1 in the open configuration, with the handgun retained in a holster attached to the first pad.

In the exemplary embodiment of FIG. 12, the holster 230 may have a receptacle 232 into which a part of the handgun 20000 or example, the barrel) is inserted. The receptacle 232 may also have a mounting flange 234 secured to the receptacle 232. The mounting flange 234 may extend in the longitudinal direction 16 and/or the lateral direction 17 from the receptacle 232 to provide a surface that can be easily attached to the second pad 152. In addition to or in the alternative to the mounting flange 234, the holster 230 may have one or more mounting straps 236, which may extend in the longitudinal direction 16 and/or in the lateral direction 17 to overlie one or more of the holes 220.

The holster 230 may be secured to the second pad 152 via screws 238 that pass through the mounting flange 234 and/or the mounting straps 236. As shown in FIG. 11, the screws 238 may fasten both the mounting flange 234 and the mounting straps 236 to the second pad 152. The screws 238 may optionally be inserted into all of the holes 220. Alternatively, the holster 230 may be secured to the second pad 152 through the use of only a subset of the holes 220. In the alternative to inserting a threaded protrusion of the screws 238 into the holes 220, other fasteners may be used. In some embodiments, the holster 230 may be modified to have protrusions that may be directly inserted into the holes 220 to secure the holster 230 to the second pad 152 without the need for separate fasteners.

As shown in FIG. 11, the holster 230 may be in a first orientation relative to the first pad 150, with the butt of the handgun 20000 tending toward the front of the shell 22. In alternative mounting arrangements, the holster 230 may be secured to the second pad 152 in a variety of different configurations. According to one alternative, the holster 230 may be mounted to the second pad 152 in a second orientation in which the holster 230 is rotated 180 degrees from the first orientation shown in FIG. 11. In such an orientation, the butt of the handgun 200 may face toward the rear of the shell 22. Such an orientation may be ideal for situations in which the system 20 is mounted to a vertical surface such as a wall. For example, if the system 20 is mounted to a wall such that the front end of the shell 22 is oriented upward, positioning the holster 230 in the second orientation may orient the handgun 200 right-side-up for ready access.

As mentioned previously, other configurations of the holes 220, such as radially symmetrical configurations, may be present in other embodiments of the invention. In such embodiments, the holster 230 may be oriented at other orientations besides the first and second orientations described above.

In other alternative embodiments, one or more articles besides a holster may be secured to the interior of the system 20. For example, one or more jewelry boxes, paper holders, currency holders, computer data storage devices, or the like may be secured to the second pad 152 and/or the first pad 150. The system 20 may be used to store any articles that may be desirably kept in a secure location. The size and weight of the system 20 may make the system 20 readily portable so that a user can easily transport articles securely in the system 20.

Referring to FIG. 12, a top elevation, perspective view illustrates the system 20 of FIG. 1 in the open configuration, with the handgun 200 contained in the holster 230 attached to the first pad 150. The holster 230 may be substantially the same as that of FIG. 11, with the mounting straps 236 arranged differently to facilitate attachment of the holster 230 to the holes 210 of the first pad 150. As mentioned previously, the holes 210 may optionally have an arrangement identical to that of the holes 220; thus, if desired, the mounting straps 236 may not require rearrangement to enable attachment of the holster 230 to the first pad 150 instead of the second pad 152.

Attachment to the first pad 150 may be preferable in certain situations. For example, when the system 20 is resting on a horizontal surface, it may be advantageous to provide the handgun 200 with the butt oriented downward, as shown, so that the handgun 200 in the orientation in which it will likely be held by the user. Attachment to the first pad 150 may also be helpful in the event that the system 20 is mounted to a vertical surface; the first shell member 30 may, in the open configuration, be in a horizontal orientation that may provide a convenient orientation for the user to grasp and withdraw the handgun 200. Furthermore, attachment to the first pad 150 may be useful in the event that the system 20 is attached to the underside of a horizontal surface, such as the underside of a cabinet or the roof of a vehicle. When the shell 22 moves to the open configuration, the first shell member 30 may then extend downward to provide the handgun 200 an accessible location. With such a mounting configuration, it may be advantageous to cause the shell 22 to only open partway, as will be further shown and described in connection with FIG. 13.

As with attachment to the second pad 152, the holster 230 may be attached to the first pad 150 in a variety of orientations. The orientation of FIG. 12 may be ideal for situations in which the system 20 is resting on a horizontal surface. However, if the system 20 is mounted to a vertical surface or to the underside of a horizontal surface, the user may approach the system 20 from proximate the forward edge of the first shell member 30 when the shell 22 is in the open configuration. Thus, it may be desirable to mount the holster 230 to the first pad 150 at a second orientation rotated 180° from that of FIG. 12. The butt of the handgun 200 may extend toward the forward edge of the first shell member 30 in such an orientation.

Figure 13:
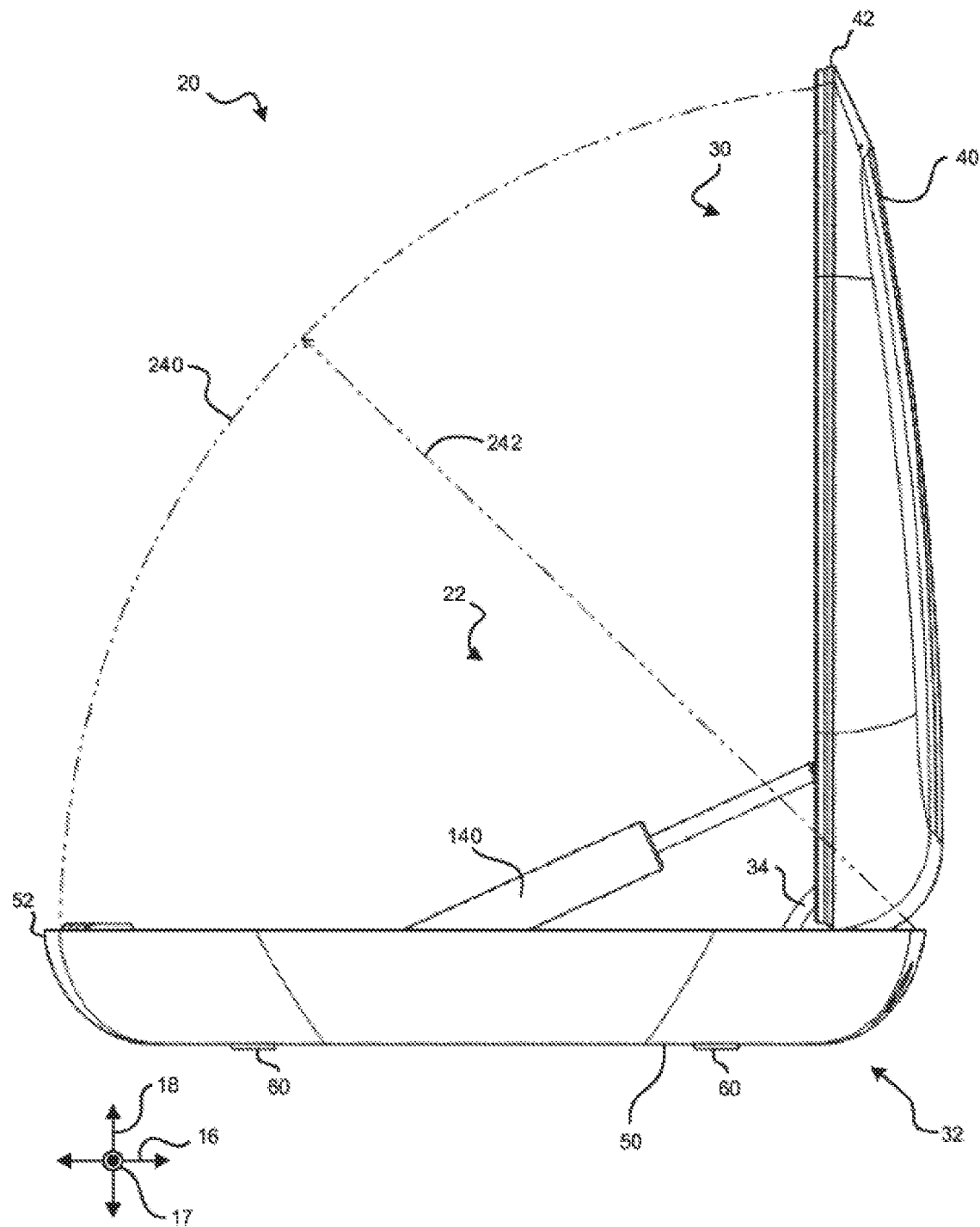
FIG. 13 is a side elevation view of the secure storage system of FIG. 1 in the open configuration, illustrating an arc along which the first rim moves as the secure storage system moves into the open configuration.

Referring to FIG. 13, a side elevation view illustrates the system 20 of FIG. 1 in the open configuration, illustrating an arc 240 along which the first rim 42 moves as the shell 22 moves into the open configuration. As shown, the arc 240 may sweep through an angle of goo so that, in the open configuration, the first rim 42 of the first shell member 30 is substantially perpendicular to the second rim 52 of the second shell member 32. However, in certain situations, it may be desirable to limit motion of the first shell member 30 relative to the second shell member 32 so that the shell 22 opens sufficiently to provide access to its contents, but does not reach the position illustrated in FIG. 13.

For example, if the system 20 is mounted to a ceiling or the underside of another object, the contents of the system 20 may be more readily accessible if the shell 22 does not fully open. Limiting the angle to which the shell 22 opens may position the first shell member 30 at an optimal angle for the user to reach and obtain the contents of the system 20 (such as the handgun 200). Furthermore, in some situations, there may be limited room for the shell 22 to open due to the presence of other objects in the zone in which the first shell member 30 will move as the shell 22 moves to the open configuration. Mounting of the system 20 to the underside of an object such as a cupboard may be one situation in which there is limited space for the shell 22 to open, and thus, it is advantageous to prevent it from opening fully.

In such situations, one or more additional pieces (not shown in FIG. 13) may be used to limit the range of motion of the first shell member 30 relative to the second shell member 32. For example, a variety of clips or other fasteners may be coupled to the shell 22, the opening mechanism 140, and/or other components to provide control over the range of motion of the first shell member 30. In some examples, such devices may limit the sweep of the first shell member 30 to 45°. Thus, in the open configuration, the first rim 42 of the first shell member 30 may extend along the line 242 illustrated in FIG. 13.

Figure 14:
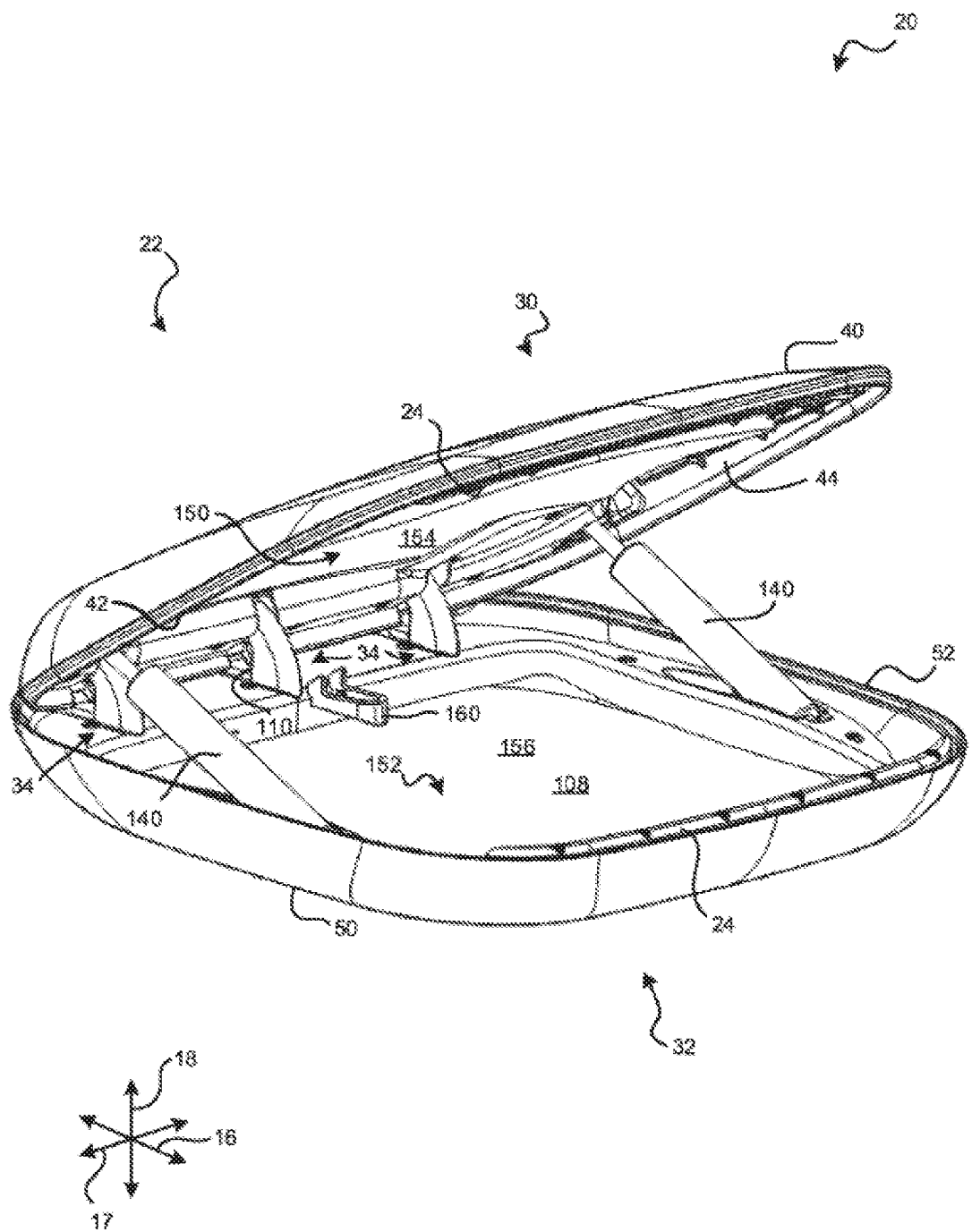
FIG. 14 is a top elevation, perspective view of the secure storage system of FIG. 1 in the open configuration, with a clip positioned to be inserted into engagement with the middle joint of the shell.

Referring to FIG. 14, a top elevation, perspective view illustrates the system 20 of FIG. 1 in the open configuration, with a clip 260 positioned to be inserted into engagement with the joint 34 that resides at the midline of the shell 22. The clip 260 may engage the joint 34 to prevent the shell 22 from opening to an angle greater than a desired maximum angle, which may be 45° as illustrated in FIG. 13. The clip 260 will be shown and described in greater detail in connection with FIG. 15.

Figure 15:
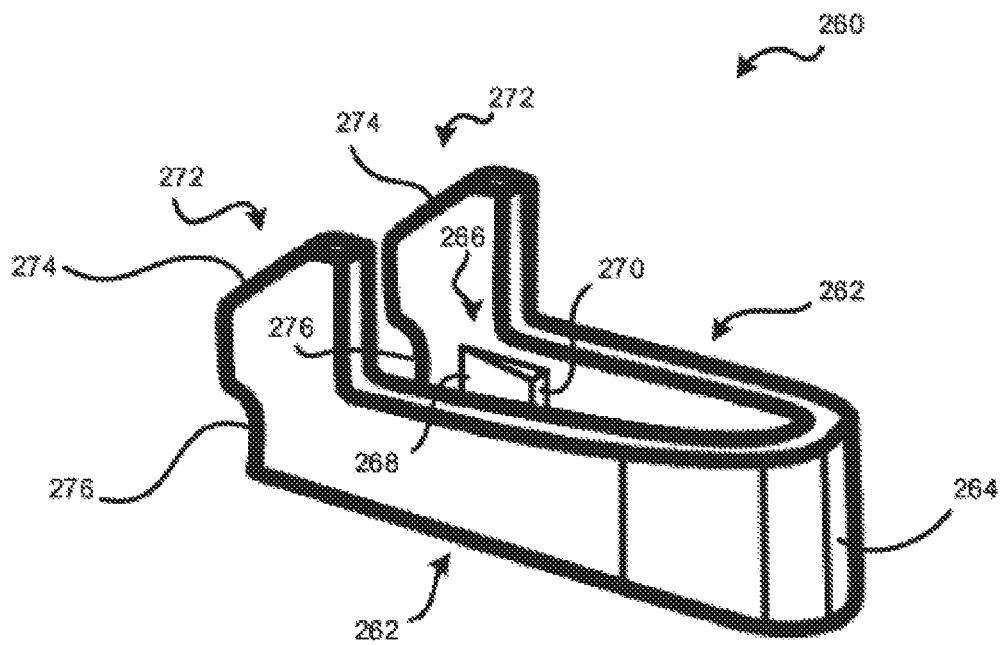
FIG. 15 is a top elevation, perspective view of the clip of FIG. 14 in isolation.
Figure 15:
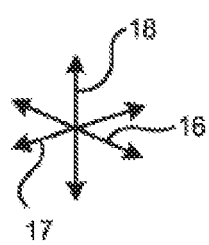

Referring to FIG. 15, a top elevation, perspective view illustrates the clip 260 of FIG. 14 in isolation. As shown, the clip 260 may have two arms 262, which may join at a connector 264. The arms 262, in combination with the connector 264, may define a U-shape that snaps into engagement with any of the joints 34, and more specifically, with the base member 110 of any of the joints 34.

More precisely, each of the arms 262 may have a detent 266 that extends toward the other arm 262. The detents 266 may each have a sloped leading edge 268 and a shear trailing edge 270. The arms 262 may be spaced apart in the lateral direction 17 by a distance approximately equal to (or slightly greater than) the width of the base member 110 in the lateral direction 17. Due to the relatively narrower space existing between the detents 266, the arms 262 may be required to flex apart as they are inserted on either side of the base member 110.

The shape of the sloped leading edges 268 may help to push the ends of the arms 262 apart as the clip 260 is inserted into engagement with the base member 110. Then, once the clip 260 has been fully inserted, the detents 266 may snap into position behind the base member 110 such that the shear trailing edges 270 are positioned in engagement with, or proximate to, the concavity 114 of the base member.

In the fully-engaged position, the shear trailing edges 270 may engage the concavity 114 to prevent inadvertent removal of the clip 260 from engagement with the base member 110. However, the user may be able to remove the clip 260 by prying or otherwise pulling the arms 262 apart to allow the shear trailing edges 270 to move forward along the longitudinal direction 16 past the concavity 114, thereby permitting removal of the clip 260 from engagement with the base member 110.

Each of the arms 262 may also have an engagement tab 272 that protrudes upward. The engagement tabs 272 may each have a chamfer 274 and a recess 276. The chamfer 274 may receive contact with the first shell member 30 when the shell 22 has been opened to the desired maximum angle. This will be further shown and described in connection with FIG. 16, as follows.

Figure 16:
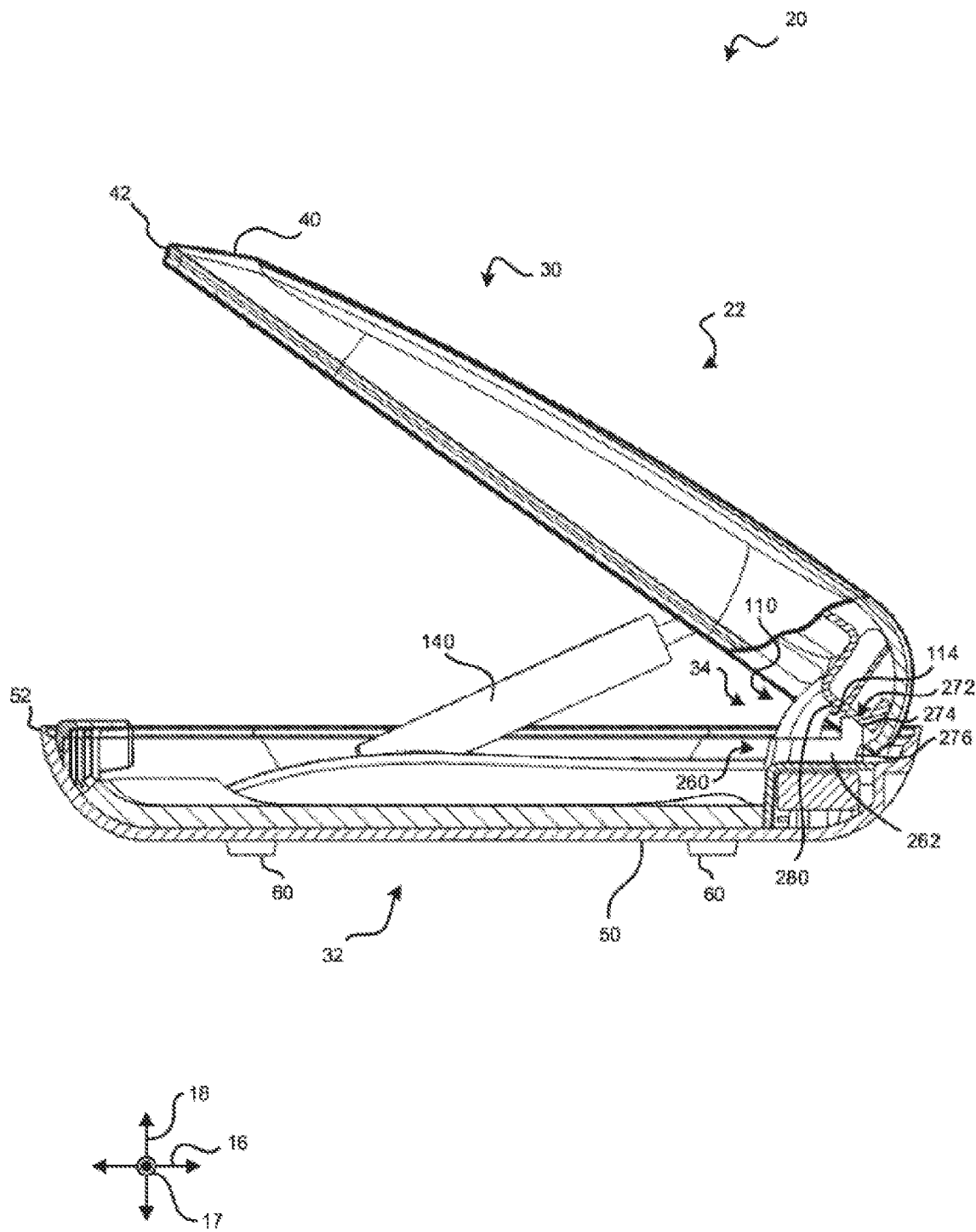
FIG. 16 is a side elevation, section view of the secure storage system of FIG. 1, with the clip of FIG. 14 in engagement with the middle joint of the shell.

Referring to FIG. 16, a side elevation, section view illustrates the system 20 of FIG. 1, with the clip 160 of FIG. 14 in engagement with the middle joint 34 of the shell 22. As described previously, the clip 160 may have been inserted along the longitudinal direction 16 into engagement with the base member 110 of the middle joint 34. The arms 262 may snapped back toward each other as the shear trailing edges 270 of the detents moved past the concavity 114 of the base member 110. The clip 160 may thus be deliberately fastened to the center joint 34 until deliberately removed by the user.

As the shell 22 is opened, the first shell member 30 may pivot upward relative to the second shell member 32, as shown. When the first shell member 30 reaches the desired maximum angle relative to the second shell member 32, a trim piece 280 of the first shell member 30 may abut the chamfer 274 of the engagement tab 272. This abutment may prevent the first shell member 30 from pivoting further relative to the second shell member 32. Thus, the angle and position of the chamfer 274 may determine the maximum angle at which the shell 22 is able to open.

As mentioned previously, the clip 260 may be designed to prevent the shell 22 from opening to an angle greater than 45°. However, in alternative embodiments (not shown), clips with differently-positioned and/or differently-angled chamfers may provide for a maximum opening angle of 15°, 30°, 60°, 75°, or any other desired angle. If desired, more than one clip may be provided with a system according to the invention so that the user can simply install the clip that corresponds to the maximum opening angle they would like the system to have. In yet other alternative embodiments, a shell may be designed to open to an angle greater than 90°. Clips or other devices may be used to control the maximum opening angle of such a shell.

Figure 17:
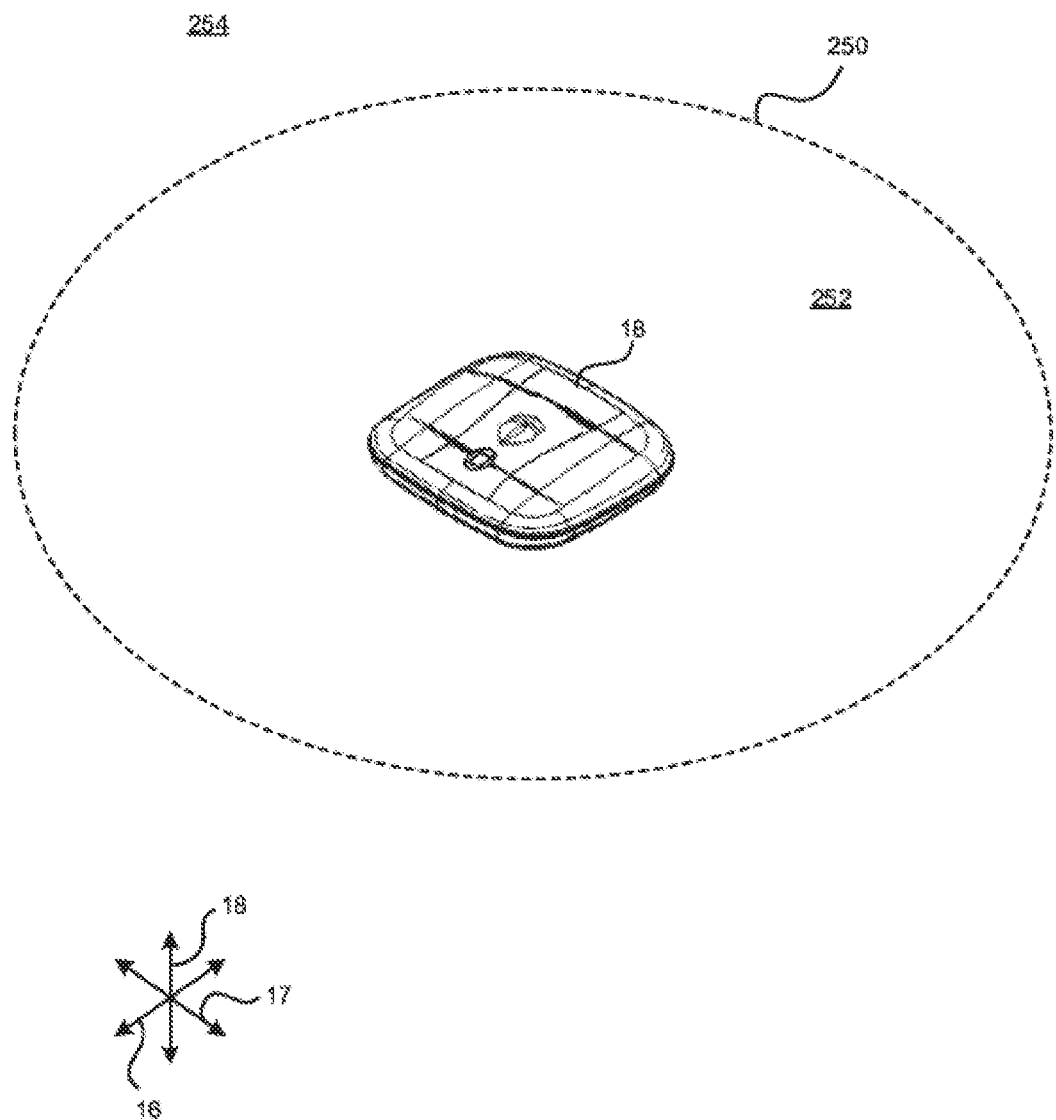
FIG. 17 is a top elevation, perspective view of the secure storage system of FIG. 1 in the closed configuration, illustrating a perimeter that defines an approved geographic zone.

Referring to FIG. 17, a top elevation, perspective view illustrates the system 20 of FIG. 1 in the closed configuration, illustrating a perimeter 250 that defines an approved geographic zone 252. Geofencing and/or other technologies may be used to define the approved geographic zone 252, in which the system 20 may be positioned without the need to transmit alerts to the authorized user. This may be accomplished in a wide variety of ways.

According to one example, when the system 20 is first configured, the authorized user may provide input to the system 20 to indicate that the system 20 is positioned at the center of the approved geographic zone 252 i.e., the center of the perimeter 250. This may be done through the use of the button 212 by, for example, opening the shell 22 to access the button 212 and then holding the button 212 down for a predetermined period of time to record the location of the system 20, for example, in the control system 28. The control system 28 may then record the location of the system 20 as the center of the approved geographic zone 252, and determine the perimeter 250 based on the location of the center.

This may be done, for example, by establishing the perimeter 250 as a radius around the center such that the perimeter 250 is generally circular (or spherical) in shape. This may provide the approved geographic zone 252 with the same circular or spherical shape. In alternative embodiments, the approved geographic zone 252 may have any known two-dimensional or three-dimensional shape, including any combination of flat and/or curved sides. If desired, stepped, flat sides may be used to approximate a curved shape such as a circle or sphere.

The control system 28 may be programmed to receive sensor data including the location of the system 20 from the GPS receiver 94, which may periodically receive GPS signals to determine the location of the system 20, as known in the art. The location may include location coordinates, such as latitude, longitude, and/or elevation. The control system 28 may further be configured to notify the authorized user if the control system 28 moves outside the approved geographic zone 252 and into an unapproved geographic zone 254 positioned outside of the perimeter 250. This may be carried out according to a wide variety of methods, one of which will be shown and described in connection with FIG. 17.

Figure 18:
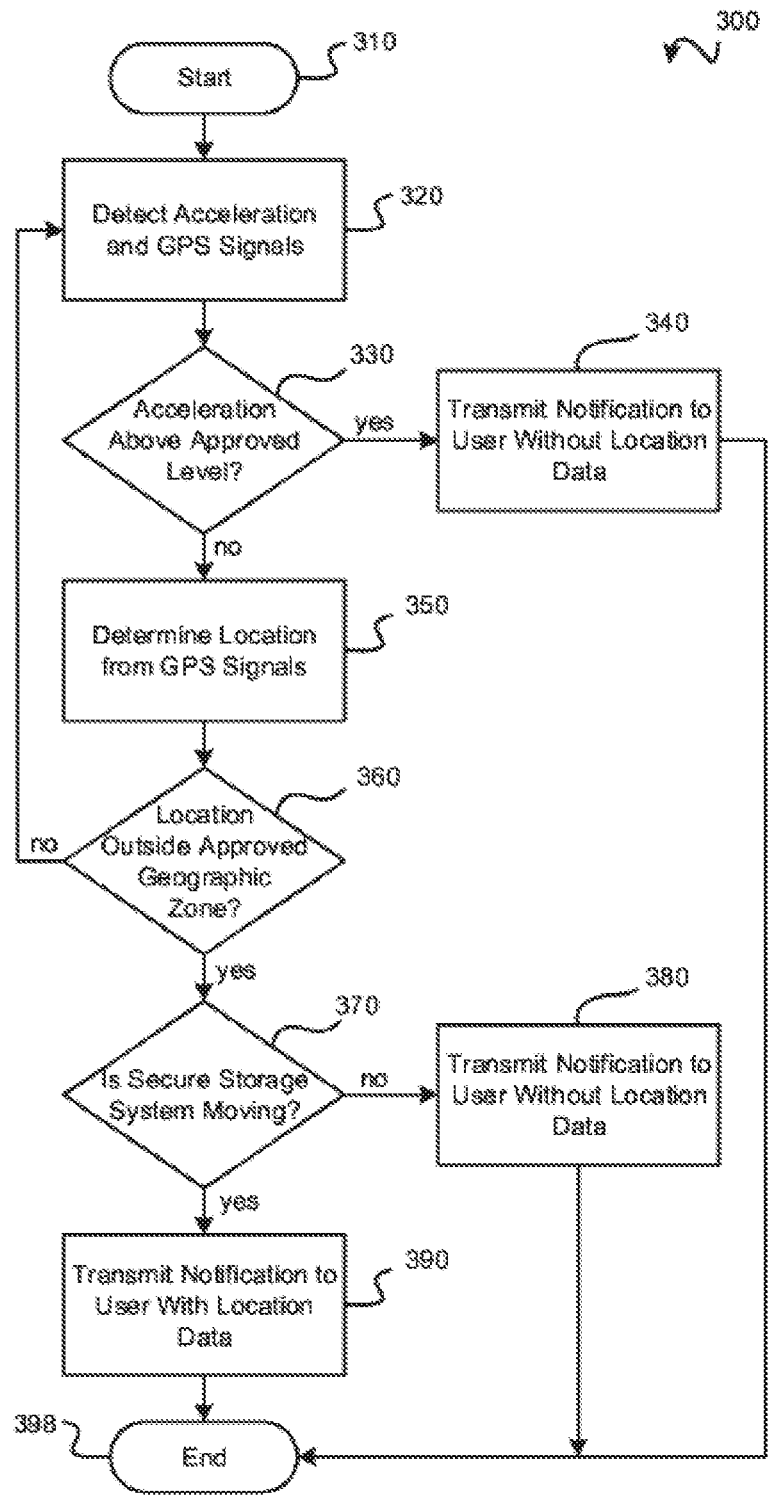
FIG. 18 is a flowchart diagram illustrating one method by which the secure storage system of FIG. 1 may monitor its status and, if warranted, transmit a notification to a user.

Referring to FIG. 18, a flowchart diagram illustrates one method 300 which the system 20 of FIG. 1 may monitor its status and, if warranted, transmit a notification to an authorized user. The method 300 be carried out by software and/or hardware instructions of the control system 28. If desired, the control system 28 may be user-configurable to enable an authorized user to configure various aspects of the method 300] The method 300 starts 310 with a step 320 in which the system 20 detects acceleration and GPS signals. More specifically, the accelerometer 187 may continuously and/or intermittently detect the acceleration level of the system 20 and transmit sensor data containing the acceleration level to the control system 28. Similarly, the GPS receiver 94 may continuously or intermittently receive GPS signals to detect the location of the system 20, and may transmit sensor data containing the location (e.g., the location coordinates) of the system 20 to the control system 28.

The step 320 may be carried out continuously or intermittently so that the control system 28 receives continuous or period sensor data with the acceleration level and/or location of the system 20. Each time such sensor data is received, the control system 28 may determine, in a determination 330, whether the acceleration level of the system 20 exceeds the predetermined threshold, which may be an approved acceleration level. As mentioned previously, this approved acceleration level may be tuned to the type of events for which the authorized user desires notification (i.e., ordinary use, or only impact events).

If the acceleration of the system 20, as measured by the accelerometer 187, has exceeded the approved acceleration level, the method 300y proceed to a step 340 in which the control system 28 initiates the transmittal of a notification to the authorized user. The notification may be transmitted wirelessly to an electronic device, or may be audible, or may take other forms, as desired. The notification may be of a type designed for immediate receipt by the authorized user.

In alternative embodiments, the notification may not be received by the authorized user until later. For example, a light or other indicator in or on the system 20 may be activated to notify the authorized user, next time he or she opens or looks at the system 20, that an attempt at tampering or theft has occurred.

In some embodiments, the notification may be perceptible to those in the vicinity of the system 20. For example, an audible alarm may serve to scare away a person attempting to tamper with or steal the system 20. In alternative embodiments, the notification may be imperceptible to the person attempting to steal or tamper with the system 20. An electronic notification to the electronic device held by the authorized user may not be perceived by the person who took the actions that prompted transmission of the notification. Thus, the person may be kept unaware that the authorized user knows of the tampering or attempted theft.

According to certain embodiments, the notification transmitted in the step 340 may not include location data for the system 20. In the context of transmission of the notification via the Internet, the location data may be omitted for privacy reasons. The authorized user may not want other individuals to obtain access to the location of his or her firearm or valuables. If desired, the notification may include an indication of the acceleration level experienced by the system 20, the probable event that caused the acceleration, and/or other information that may help the authorized user to assess the level of risk to the system 20.

If, in the determination 330, the acceleration of the system 20 has not exceeded the approved acceleration level, the method 300 may proceed to a step 350 in which the location of the system 20 is determined based on the GPS signals received by the GPS receiver 94. This may entail triangulation of the location coordinates of the system 20 based on the locations of the GPS satellites that transmit the GPS signals, as known in the art.

Once the location of the system 20 has been determined, the method 300y proceed to a determination 360 in which the system 20, for example, in the control system 28, determines whether the system 20 is outside the approved geographic zone 252. If the system 20 is still within the approved geographic zone 252, the control system 28 may conclude that the system 20 is not being stolen or tampered with, and may thus proceed back to the step 320 to continue gathering sensor data until an abnormal condition is found.

If the location of the system 20 is outside the approved geographic zone 252 (or if the location of the system 20 is within the unapproved geographic zone 254), the method 300 may proceed to a determination 370. In the determination 370, the system 20 determines, for example, in the control system 28, whether the system 20 is moving. This determination may be made with acceleration data from the accelerometer 187 and/or with location data from the GPS receiver 94.

According to some examples, the current sensor data may be compared with previously obtained and/or processed sensor data to determine whether the system 20 is moving. For example, the current location of the system 20 may be compared with location data from the recent past. If the two are significantly different, it may be concluded that the system 20 is in motion. Sustained and/or repeated acceleration of the system 20 may similarly indicate that the system 20 is moving.

If the system 20 is not deemed to be moving, the method 300 may proceed to a step 380 in which a notification is transmitted to the authorized user, again without location data. Like the step 340, the step 380 may entail transmission of an audible notification, and electronic notification, or any other notification type. The notification may be immediate or delayed, and may be perceptible or imperceptible to the person whose actions caused the notification to be sent.

If the system 20 is moving, the method 300 may instead proceed to a step 390 in which the notification is transmitted to the authorized user with the location data. Like the step 340 and the step 380, this notification may take any of the forms mentioned previously. If the system 20 is moving, it may be assumed that privacy concerns are outweighed by the need to locate and recover the system 20; this may justify the inclusion of the location data in the notification.

After the step 340, the step 380, or the step 390 has been carried out, the method 300 ends 398. If desired, no detection and/or notification steps may be undertaken until the authorized user performs an action to reset the control system 28, for example, by presenting the proper credentials to open the shell 22. Alternatively, the method 300 may continue to iterate even after notification has been carried out in the step 340, the step 380, and/or the step 390. Sensor data may advantageously be logged for subsequent review by the authorized user regardless of whether a condition exists that warrants transmission of a notification. Thus, the authorized user can gain helpful information regarding the conditions to which the system 20 has been subjected.

The method 300 only one of many different implementations of the invention. The sensor system 26 may include any of a wide variety of sensor types, and the sensor data provided by the sensor system 26 may be used to make notification decisions according to a wide variety of methods different from that of the method 300 uch methods will be envisioned by a person of skill in the art with the aid of the present disclosure.

The claims are not limited to the specific implementations described above. Various modifications, changes and variations may be made in the arrangement, operation and details of the implementations described herein without departing from the scope of the claims.

What is claimed is:

1. A secure storage system comprising:
a shell having a closed configuration in which the shell defines an interior space generally inaccessible from outside the shell, and an open configuration in which the interior space is accessible, the shell comprising:
a first shell member;
a second shell member;
a joint that movably couples the first shell member to the second shell member to enable the shell to move between the closed configuration and the open configuration;
a locking mechanism within the interior space, the locking mechanism having a locked position in which the locking mechanism restricts motion of the shell to the open configuration, and an unlocked position in which the locking mechanism permits motion of the shell to the open configuration;
a control system comprising at least one setting; and
a user interface within the interior space for modifying a setting of the control system;
wherein the control system comprises at least one from the list of: an authentication selection setting, a credentials setting, and a notification parameters setting.

2. The secure storage system of claim 1, wherein the user interface comprises a switch.

3. The secure storage system of claim 1, wherein the user interface comprises a pressure switch.

4. The secure storage system of claim 1, wherein the control system comprises an accelerometer sensitivity setting.

5. The secure storage system of claim 1, wherein the control system comprises an authentication selection setting.

6. The secure storage system of claim 5, wherein the authentication selection setting comprises at least an option for fingerprint authentication and an option for RFID authentication.

7. The secure storage system of claim 1, wherein the control system comprises a credentials setting.

8. The secure storage system of claim 1, wherein the control e comprises a notification parameters setting.

\* \* \* \* \*